(12) United States Patent
Bruls et al.

(10) Patent No.: US 10,567,728 B2
(45) Date of Patent: Feb. 18, 2020

(54) VERSATILE 3-D PICTURE FORMAT

(71) Applicant: KONINKLIJKE PHILIPS N.V., Eindhoven (NL)

(72) Inventors: Wilhelmus Hendrikus Alfonsus Bruls, Eindhoven (NL); Reinier Bernardus Maria Klein Gunnewiek, Utrecht (NL); Gerardus Wilhelmus Theodorus Van Der Heijden, Haaren (NL); Philip Steven Newton, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 118 days.

(21) Appl. No.: 15/228,402

(22) Filed: Aug. 4, 2016

(65) Prior Publication Data

US 2016/0344995 A1   Nov. 24, 2016

Related U.S. Application Data

(63) Continuation of application No. 13/054,521, filed as application No. PCT/IB2009/053180 on Jul. 22, 2009, now Pat. No. 9,432,651.

(30) Foreign Application Priority Data

Jul. 24, 2008   (EP) ..................................... 08305420
Nov. 24, 2008   (EP) ..................................... 08169821

(51) Int. Cl.
*H04N 13/122*   (2018.01)
*H04N 13/161*   (2018.01)
(Continued)

(52) U.S. Cl.
CPC ......... *H04N 13/122* (2018.05); *H04N 13/128* (2018.05); *H04N 13/139* (2018.05);
(Continued)

(58) Field of Classification Search
None
See application file for complete search history.

(56) References Cited

U.S. PATENT DOCUMENTS 5,737,012 A   4/1998   Tabata et al.
7,085,409 B2   8/2006   Sawhney et al.
(Continued)

FOREIGN PATENT DOCUMENTS

CN   1643939 A   7/2005
CN   101156175 A   4/2008
(Continued)

OTHER PUBLICATIONS

R. Fisher, S. Perkins, A. Walker and E. Wolfart. "Geometric Scaling." (2003). Retrieved from http://homepages.inf.ed.ac.uk/rbf/HIPR2/scale.htm on May 23, 2018.*
(Continued)

*Primary Examiner* — Ryan McCulley

(57) ABSTRACT

A 3-D picture signal is provided as follows. An image and depth components having a depth map for the image are provided, the depth map includes depth indication values. A depth indication value relates to a particular portion of the image and indicates a distance between an object at least partially represented by that particular portion of the image and the viewer. The 3-D picture signal conveys the 3-D picture according to a 3D format having image frames encoding the image. Extra frames (D, D') are encoded that provide the depth components and further data for use in rendering based on the image and the depth components. The extra frames are encoded using spatial and/or temporal subsampling of the depth components and the further data, while the extra frames are interleaved with the image frames in the signal in a Group of Pictures coding structure (GOP).

22 Claims, 12 Drawing Sheets

(51) Int. Cl.
*H04N 13/178* (2018.01)
*H04N 13/128* (2018.01)
*H04N 13/139* (2018.01)
*H04N 13/15* (2018.01)
*H04N 13/194* (2018.01)
*H04N 13/254* (2018.01)
*H04N 19/597* (2014.01)

(52) U.S. Cl.
CPC .......... *H04N 13/15* (2018.05); *H04N 13/161* (2018.05); *H04N 13/178* (2018.05); *H04N 13/194* (2018.05); *H04N 13/254* (2018.05); *H04N 19/597* (2014.11); *H04N 2213/003* (2013.01); *H04N 2213/005* (2013.01)

(56) References Cited

U.S. PATENT DOCUMENTS

| | | | |
|---|---|---|---|
| 2002/0080143 | A1* | 6/2002 | Morgan .................. G06T 17/00 345/581 |
| 2003/0198290 | A1 | 10/2003 | Millin et al. |
| 2005/0041736 | A1 | 2/2005 | Butler-Smith et al. |
| 2005/0089212 | A1 | 4/2005 | Mashitani et al. |
| 2005/0190180 | A1 | 9/2005 | Jin et al. |
| 2005/0219239 | A1 | 10/2005 | Mashitani et al. |
| 2007/0041442 | A1 | 2/2007 | Novelo |
| 2007/0047040 | A1 | 3/2007 | Ha |
| 2007/0247477 | A1* | 10/2007 | Lowry ............... H04N 13/0438 345/629 |
| 2009/0015662 | A1* | 1/2009 | Kim .................... H04N 19/597 348/43 |
| 2010/0231689 | A1 | 9/2010 | Bruls et al. |
| 2011/0142309 | A1 | 6/2011 | Zhang et al. |
| 2011/0216833 | A1* | 9/2011 | Chen .................. H04N 13/0022 375/240.16 |

FOREIGN PATENT DOCUMENTS

| | | |
|---|---|---|
| EP | 0267000 A2 | 5/1988 |
| EP | 1408703 A2 | 4/2004 |
| EP | 1578142 A1 | 9/2005 |
| JP | H0946729 A | 2/1997 |
| JP | 2004152133 A | 5/2004 |
| JP | 2004153808 A | 5/2004 |
| JP | 2008103804 A | 5/2008 |
| JP | 2008141666 | 6/2008 |
| WO | 0011597 A1 | 3/2000 |
| WO | 0227667 A1 | 4/2002 |
| WO | 02059835 A1 | 8/2002 |
| WO | 2004071102 A1 | 8/2004 |
| WO | 2005114998 A1 | 12/2005 |
| WO | 2006137000 A1 | 12/2006 |
| WO | 2007006051 A2 | 1/2007 |
| WO | 2007011147 A1 | 1/2007 |
| WO | 2007057497 A1 | 5/2007 |
| WO | 2007113725 A2 | 10/2007 |
| WO | 2008067363 A2 | 6/2008 |
| WO | 2009040701 A1 | 4/2009 |
| WO | 2010070545 A1 | 6/2010 |

OTHER PUBLICATIONS

Vetro, Anthony, Sehoon Yea, and Aljoscha Smolic. "Toward a 3D video format for auto-stereoscopic displays." Applications of Digital Image Processing XXXI. vol. 7073. International Society for Optics and Photonics, 2008. (Year: 2008).*

Kalva et al: "Design and Evaluation of a 3D System Based on H.264 View Coding"; Proceedings of the 2006 International Workshop on Network and Operating Systems Support for Digital Audio and Video, Article. No. 12, ACM NY,NY 2006, pp. 1-6.

Millen et al: "Three Dimensions Via the Internet"; SPIE Proceedings, vol. 4297 Stereoscopic Displays and Virtual Reality Systems VIII, Jun. 2001, pp. 1-6.

Redert et al: "Philips 3D Solutions:From Content Creation to Visualization"; Proceedings of the Third International Symposium on 3D Data Processing, Visualization, and Transmission (3DPVT'06), 2006, pp. 1-3.

Schwarz et al: "Hierarchical B Pictures"; Joint Video Team )JVT) of ISO/IEC MPEG & ITU-T VCEG, 16th Meeting, Jul. 2005, pp. 1-25.

Um et al: "A Study on the 3D Video Generation Technique Using Multi-View and Depth Camera"; The Institue of Electronics and Information Engineers Autum Conference, vol. 28, 2nd Etition, 2005, pp. 549-552.

Hutchison: Introducing DLP 3-D TV, Texas Instruments, Article in EETimes, Dec. 19, 2007, 5 Page Document.

"Auxiliary Video Data Representation"; MPEG-C 3 Standard:ISO/IEC 23002-3:Apr. 2006, 4 Page Document.

Redert et al: "Attest:Advanced Three-Dimensional Television System Technologies"; Proceedings of the First International Symposium on 3D Data Proc. Visualization and Transmission, 2002, pp. 313-319.

Kauff et al: "Depth Map Creation and Image-Based Rendering for Advanced 3DTV Services Providing Interoperability and Scalability"; 2007, Science Direct, Signal Processing:Image Communicaiton, Edition 22, pp. 217-234.

"Yuv Video"; May 2007, Retrieved Nov. 12, 2013 From http://www.mediacollege.com/video/signal/yuv.html.

* cited by examiner $\underline{Pmax} \in \underline{GD}$

| STS → <br> DV ↓ | 10 <br> A (FIG. 3) | 6 <br> A (FIG. 3) | 5 <br> A (FIG. 4) |
|---|---|---|---|
| 255 | 10 | -9 | 6 |
| 254 | 9.9 | -8.9 | 5.9 |
| ... | | | |
| 130 | 0 | 0 | 0 |
| ... | | | |
| 1 | -9.9 | 8.9 | -5.9 |
| 0 | -10 | 9 | -6 |

FIG. 6

$\underline{Poff} \in \underline{GD}$

| STS → <br> SZ ↓ | 10 | 8 | 6 | 5 | 3 | 1 |
|---|---|---|---|---|---|---|
| 50" | -10 | -15 | -8 | - | - | - |
| 40" | -15 | -20 | -13 | - | - | - |
| 30" | -20 | -25 | -25 | - | - | - |

FIG. 7

$\underline{OPT} \in \underline{GD}$

| SZ ↓ | STS | Poff |
|---|---|---|
| 50" | 8 | -15 |
| 40" | 9 | -18 |
| 30" | 10 | -20 |

FIG. 8

| | H | V | fr | Mpix/s | | Comment |
|---|---|---|---|---|---|---|
| mono@30p/60i | 1920 | 1080 | 30 | 62.2 | | Mono |
| LRD movie@24p | 1280 | 720 | 60 | 55.3 | | D,T,BG,BD: 640x360@12Hz |

|  | H | V | fr | Mpix/s | | Comment |
|---|---|---|---|---|---|---|
| LR@30p/60i | 1920 | 1080 | 60 | 124.4 | 0% | only stereo, panas ref |
| LR@24p movie | 1920 | 1080 | 48 | 99.5 | | only stereo |
| LR@60p sport | 1280 | 720 | 120 | 110.6 | | only stereo |
| LR/D movie@24p | 1920 | 1080 | 48 | 99.5 | | D,T,BG,BD: 960x540 |
| LR/LP sport@60p | 1280 | 720 | 120 | 110.6 | | D,T,BG,BD: 640x360 |
| LR/LDD' movie@24p | 1920 | 1080 | 60 | 124.4 | | D,T: 1920*1080, BG,BD: 960x540 |
| LR/LDD' sport@60p | 1280 | 720 | 150 | 138.2 | 11.1% | D,T: 1280*360, BG,BD: 640x360 |

FIG. 15 various subsampling methods (after the appropriate filtering!)

o is simple
x is skipped

Normal subsampling 1920*1080*->960*540

```
oxoxoxox...            oooo...
xxxxxxxx...     ➔      oooo...
oxoxoxox...
xxxxxxxx...
................
```

Normal vertical subsampling 1920*1080->1920*540

```
oooooooo...            oooooooo...
xxxxxxxx...     ➔      oooooooo...
oooooooo...
xxxxxxxx...
................
``` quinqunx subsampling 1920*1080->1920*540 or 960*1080

```
oxoxoxox...            oooooooo...           oooo...
xoxoxoxo...     ➔      oooooooo...    or     oooo...
oxoxoxox...                                  oooo...
xoxoxoxo...                                  oooo...
................
```

FIG. 21

VERSATILE 3-D PICTURE FORMAT

CROSS REFERENCE TO RELATED APPLICATION

This application is a continuation of prior U.S. patent application Ser. No. 13/054,521, filed Jan. 17, 2011, which is a national application of PCT Application No. PCT/IB2009/053180, filed Jul. 22, 2009 and claims the benefit of European Patent Application No. 08169821.9, filed Nov. 24, 2008, and European Patent Application No. 08305420.5, filed Jul. 24, 2008, the entire contents of each of which are incorporated herein by reference thereto.

FIELD OF THE INVENTION

An aspect of the invention relates to a method of providing a 3-D picture that comprises a pair of images, one picture being intended for one eye of the viewer, the other picture being intended for the other eye of the viewer. The 3-D picture may form part of, for example, a sequence of 3-D pictures that have a similar format so as to constitute a video. Other aspects of the invention relate to a 3-D picture provision system, a signal that conveys a 3-D picture, a method of rendering a 3-D picture, a 3-D picture rendering system, and a computer program product for a programmable processor.

BACKGROUND OF THE INVENTION

A visual 3-D rendering may be obtained on the basis of a signal that comprises a pair of pictures: a left picture and a right picture intended for the left eye and the right eye, respectively, of a viewer. In the case of a video, the signal will comprise a sequence of such picture pairs. The left and right pictures comprised therein may directly be rendered on a stereoscopic display device, which may require a viewer to wear a pair of glasses. A left-eye glass passes a rendered left picture to the left eye. A right-eye glass passes a rendered right picture to the right eye. For example, the display device may alternately display rendered left pictures and rendered right pictures. In that case, the left-eye glass is made transparent when a rendered left picture is displayed, and is opaque otherwise. Similarly, the right-eye glass is made transparent when a rendered right picture is displayed, and is opaque otherwise.

A signal that comprises a pair of pictures, or a sequence of picture pairs that constitutes a 3-D video, as described in the preceding paragraph, is typically generated for a particular rendering context in terms of, for example, screen size and viewing distance. The particular rendering context may be, for example, a cinema with a screen that is 12 meters wide and where viewers are typically sitting at a distance of 18 meters from the screen. In case a rendering context is different from the rendering context for which the signal has been generated, the 3-D video will look different. For example, in case the 3-D video that has been generated for the cinema is rendered on a home video set, a viewer will experience a different visual impression that in the cinema. Depth effects will typically be smaller and, moreover, there may be an apparent depth shift in the sense that an object which appears to be far behind the screen in the cinema appears to be nearly in front of the screen of the home video set.

A viewer, who watches a 3-D video in a private environment, such as at home, may wish to adjust depth effects so as to obtain a rendering that the user experiences as most pleasant. In principle, it is possible to achieve this by means of an interpolation, or an extrapolation, which is based on each pair of images comprised in the 3-D video. In effect, a left picture and a right picture are compared so as to obtain a so-called disparity map expressing differences between these pictures, in particular in terms of horizontal displacement. Depth effects adjustments may be expressed in the form of a modified disparity map, which is used to generate a new pair of images. Such a process of interpolation, or extrapolation, is relatively complex and, therefore, relatively costly. Moreover, such a process may introduce perceptible artifacts, which may be less pleasant to the viewer.

United States patent application published under number 2005/0190180 describes a method for customizing scene content, according to a user or a cluster of users, for a given stereoscopic display. Customization information about the user is obtained. A scene disparity map for a pair of given stereo images is also obtained. An aim disparity range for the user is determined. A customized disparity map is generated that correlates with the user's fusing capability of the given stereoscopic display. The stereo images are rendered or re-rendered for subsequent display.

SUMMARY OF THE INVENTION

There is a need for a versatile 3-D video signal that allows satisfactory rendering on a great variety of display devices. The independent claims, which are appended to the description, define various aspects of the invention that better address this need. The dependent claims define additional features for implementing the invention to advantage.

In accordance with an aspect of the invention, a method of providing a 3-D picture signal comprises
  providing an image;
  providing depth components comprising a depth map (DM) for the image, the depth map comprising depth indication values, a depth indication value relating to a particular portion of the image and indicating a distance between an object at least partially represented by that portion of the image and the viewer,
  providing the signal that conveys the 3-D picture according to a 3D format having image frames encoding the image,
  encoding extra frames (D, D') that provide the depth components and further data for use in rendering based on the image and the depth components, the extra frames being encoded using spatial and/or temporal subsampling of the depth components and the further data,
  interleaving the extra frames with the image frames in the signal in a Group of Pictures coding structure (GOP).

In an embodiment of the method, the image frames and the extra frames are encoded using the spatial and/or temporal subsampling of the depth components and the further data at a resolution tuned to a predetermined bandwidth for transfer of the signal In an embodiment of the method, the method comprises combining, in an extra frame, information of multiple time instances so that the extra frames comprise components of multiple time instances.

In an embodiment of the method the extra frames comprise at least one of temporal and spatial depth, occlusion texture, occlusion depth and transparency information, or at least one of depth information, transparency information, background texture and background depth, or metadata being additional image information to improve 3D perceived quality or content related information.

In an embodiment of the method, the extra frames are temporally subsampled by at least one of
- skipping a temporally subsampled component while not temporally subsampling another component;
- having different phases for depth and transparency;
- a factor 2.

In an embodiment of the method, the depth components and the further data of the extra frames are spatially subsampled by at least one of
- horizontally and vertically subsampling with a factor of 2:1 of both the depth and transparency components;
- horizontally and vertically subsampling with a factor of 2:1 of both the depth and transparency components;
- quinqunx subsampling based on diagonal filtering;
- only subsampling in the vertical direction.

In an embodiment of the method, the extra frames regarding first, second and third sequential time instances are encoded based on predicting depth components (D3) at the third time instance based on depth components (D1) at the first time instance, and predicting depth components (D2) at the second time instance based on depth components (D1, D3) at the first time instance and at the third time instance.

In an embodiment of the method, the extra frames (D,D') are encoded as stored bidirectional extra frames (stored B frames), a stored bidirectional extra frame being encoded based on bidirectional predicting using a subsequent stored bidirectional extra frame and a preceding stored bidirectional extra frame.

In an embodiment of the method, the image frames in the 3D format have different image subframes comprising intensity (Y) or color (U,V) components and the different the depth components and further data in the extra frames are accommodated in the different image subframes; or the image frames include left image frames (L) having a picture intended for a left eye of a viewer and right image frames (R) having a picture intended for a right eye of a viewer.

In accordance with an aspect of the invention, a 3-D picture signal provision system comprises:
a picture-providing arrangement for providing an image;
a depth map provider for providing depth components comprising a depth map (DM) for the image, the depth map comprising depth indication values, a depth indication value relating to a particular portion of the image and indicating a distance between an object at least partially represented by that portion of the image and the viewer; and
a signal provider for
  providing the signal that conveys the 3-D picture according to a 3D format having image frames encoding the image,
  encoding extra frames (D, D') that provide the depth components and further data for use in rendering based on the image and the depth components, the extra frames being encoded using spatial and/or temporal subsampling of the depth components and the further data,
  the signal comprising a Group of Pictures coding structure (GOP) having the extra frames interleaved with the image frames.

In accordance with an aspect of the invention, a signal that conveys a 3-D picture according to a 3D format having image frames encoding the image, comprises
  encoded extra frames (D, D') that provide the depth components and further data for use in rendering based on the image and the depth components, the extra frames being encoded using spatial and/or temporal subsampling of the depth components and the further data, and
  a Group of Pictures coding structure (GOP) having the extra frames interleaved with the image frames.

In an embodiment a storage medium comprises the above signal.

In accordance with an aspect of the invention, a method of rendering a 3-D picture on the basis of the above signal comprises:
  extracting and separating extra frames from the Group of Pictures coding structure (GOP) having the extra frames interleaved with the image frames, and
  generating a shifted viewpoint picture from the image and the depth components based on the encoded extra frames (D, D') that provide the depth components and further data, the extra frames being encoded using spatial and/or temporal subsampling of the depth components and the further data.

In accordance with an aspect of the invention, a 3-D picture rendering system for rendering a 3-D picture on the basis of the above signal comprises:
  a demultiplexer (DMX) for extracting and separating extra frames from the Group of Pictures coding structure (GOP) having the extra frames interleaved with the image frames,
  a shifted viewpoint generator (SHG) for generating a shifted viewpoint picture from the image and the depth components based on the encoded extra frames (D, D') that provide the depth components and further data, the extra frames being encoded using spatial and/or temporal subsampling of the depth components and the further data.

At a rendering end a first picture may be extracted from the image, and a shifted viewpoint picture may be generated from the first picture and the depth map. The shifted viewpoint picture represents the scene from a viewpoint that is different from that of the first picture. An appropriate rendering can be obtained by adjusting the amount of shift, in terms of viewpoint, of the shifted viewpoint picture with respect to the first picture. The amount of shift will typically be rendering context dependent: a larger screen or a smaller screen can be accommodated for by an appropriate amount of shift. Importantly, the shifted viewpoint picture can be generated in a relatively precise yet simple fashion from the first picture and the depth map, which is specifically dedicated to the first picture. Accordingly, a satisfactory visual 3-D rendering can be obtained on a great variety of display devices in a cost-efficient manner.

It should be noted that a 3-D picture, or a sequence thereof, which has been provided in accordance with the invention, is also particularly suited for rendering by means of auto-stereoscopic display devices. Such a rendering typically involves generating multiple shifted viewpoint pictures, each of which represents a scene concerned from a particular viewpoint. These multiple shifted viewpoint pictures can be generated in a relatively simple fashion from the first picture and the depth map, which is specifically dedicated to the first picture. The second picture may effectively be ignored for the purpose of auto-stereoscopic rendering. Accordingly, the depth map may effectively be used for two purposes: firstly for the purpose of adapting to a particular rendering context and, secondly, for the purpose of generating multiple shifted viewpoint pictures in case of rendering by means of an auto-stereoscopic display device.

It should further be noted that a 3-D picture, or a sequence thereof, which has been provided in accordance with the invention, will typically comprise a modest amount of additional data compared with a basic 3-D picture that comprises a pair of pictures only. This is because a depth map will typically comprise a modest amount of data compared with a picture, which constitutes a visual representation of a scene. A depth map may have a lower resolution than a picture to which the depth map pertains. Furthermore, a depth map needs only to comprise a single value for a pixel or a cluster of pixels, whereas a picture typically comprises various values for a pixel: a luminance value, and two chrominance values. Accordingly, a storage medium, such as, for example, a DVD disk, which provides sufficient capacity for storing a basic 3-D video, will typically also provides sufficient capacity for storing a 3-D video that has been provided in accordance with the invention. Similarly, a transmission channel that allows transmission of a basic 3-D video, will typically also allow transmission of a 3-D video that has been provided in accordance with the invention. The aforementioned advantages can thus be achieved with only a relatively small investment in terms of storage capacity, or bandwidth, or both.

An implementation of the invention advantageously comprises one or more of the following additional features, which are described in separate paragraphs that correspond with individual dependent claims.

Preferably, the rendering guidance data specifies respective parameters for respective rendering contexts. The respective parameters relate to generating a shifted viewpoint picture from the first picture and the depth map, which is specifically dedicated to the first picture.

The rendering guidance data preferably comprises a set of parameters for a first stereo mode, and a set of parameters for a second stereo mode. In the first stereo mode, a shifted viewpoint picture, which is generated from the first picture and the depth map, constitutes a rendered first picture, and the second picture constitutes a rendered second picture. In the second stereo mode, the first picture constitutes a rendered first picture, and a shifted viewpoint picture, which is generated from the first picture and the depth map, constitutes a rendered second picture.

The aforementioned respective sets of parameters are preferably provided with a definition of a first stereo strength range in which the first stereo mode should apply, and a second stereo strength range in which the second stereo mode should apply.

The rendering guidance data may define respective maximum parallax shift values for respective depth indication values.

The rendering guidance data may define respective parallax offset values for respective screen sizes.

The rendering guidance data may comprise an indication of depth map precision.

A background picture that is specifically dedicated to the first picture is preferably provided.

In addition, an alpha-map that is specifically dedicated to the first picture is preferably provided. The alpha-map defines gradual transitions in a shifted viewpoint picture that can be generated from the left picture, the depth map and the background picture.

The present invention is further embodied in a method wherein the first, the second picture and the depth map are provided at a resolution tuned to a predetermined bandwidth for transfer of the signal and wherein extra frames are encoded providing further data for use in rendering based on an image and depth components.

The underlying idea is that the first, the second picture and the depth map may be provided at a resolution tuned to the available bandwidth for transfer of the first and second picture in the original resolution. The extra frames in turn are provided in order to provide further data for use in rendering based on an image and depth components.

The present invention is further embodied in a 3-D picture provision system according to the first, the second picture and the depth map are provided at a resolution tuned to a pre-determined bandwidth for transfer of the signal and wherein extra frames are encoded providing further data for use in rendering based on an image and depth components.

The present invention is further embodied in a signal that conveys a 3-D picture, comprising: a pair of pictures comprising a first picture (LP) being intended for one eye of a viewer, and a second picture (RP) being intended for the other eye of the viewer; a depth map (DM) specifically dedicated to the first picture (LP), the depth map comprising depth indication values, a depth indication value relating to a particular portion of the first picture and indicating a distance between an object at least partially represented by that portion of the first picture and the viewer, and wherein the first, the second picture and the depth map are provided at a resolution tuned to a predetermined bandwidth for transfer of the signal and wherein extra frames are encoded providing further data for use in rendering based on an image and depth components.

The present invention is further embodied in a storage medium comprising a signal.

A detailed description, with reference to drawings, illustrates the invention summarized hereinbefore as well as the additional features.

BRIEF DESCRIPTION OF THE DRAWINGS

FIG. 6 is a data diagram that illustrates an example of rendering guidance data that may be comprised in the supplemented versatile 3-D video signal.

FIG. 7 is a data diagram that illustrates another example of rendering guidance data that may be comprised in the supplemented versatile 3-D video signal.

FIG. 8 is a data diagram that illustrates yet another example of rendering guidance data that may be comprised in the supplemented versatile 3-D video signal.

FIG. 13, shows an overview for BD players for monoscopic video, 30 Hz progressive or 60 Hz interlaced and.

FIG. 14, shows an example on how an L'R'D' signal can be efficiently coded using AVC/H264 or MVC having approximately the same bit-rate as required for a monoscopic 1080p 24 Hz mono signal.

FIG. 15, shows various modes and options for new 3D Blu-ray applications.

FIG. 21 shows a table of quinqunx subsampling components.

DETAILED DESCRIPTION

Figure 1:
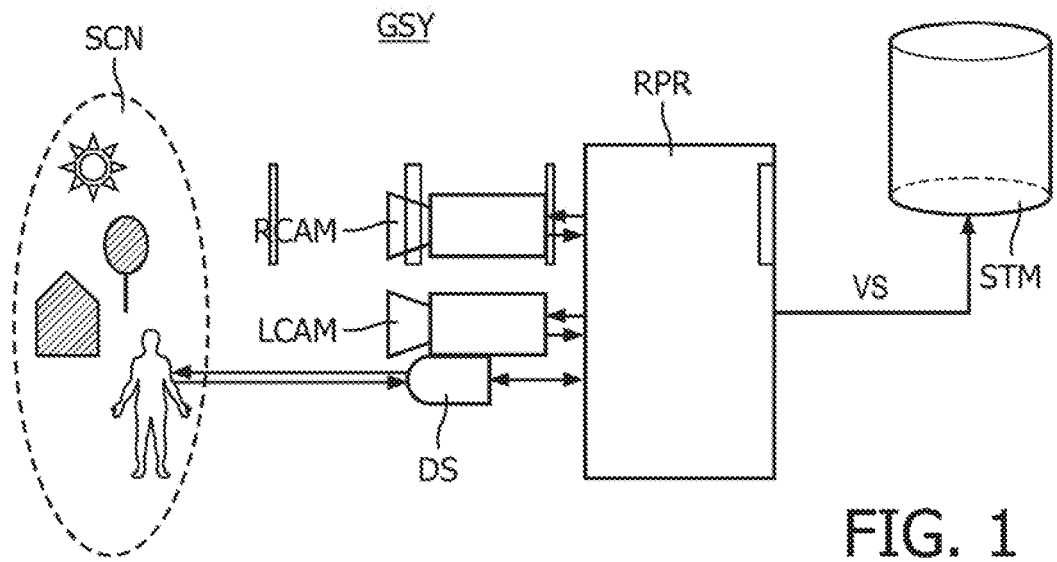
FIG. 1 is a block diagram that illustrates a 3-D video generation system.

FIG. 1 illustrates a 3-D video generation system GSY. The 3-D video generation system GSY comprises a pair of cameras, a right camera RCAM and a left camera LCAM, a recording processor RPR, and a storage medium STM. A depth scanner DS is associated with the left camera LCAM. The pair of cameras RCAM, LCAM is directed towards a scene SCN as to capture a 3-D video of the scene SCN. The scene SCN comprises various objects, such as, for example, a person, a tree, a house, and the sun in the sky. Each object has a given distance with respect to the pair of cameras, which may be regarded as a virtual observer watching the scene SCN.

The right camera RCAM and the left camera LCAM may each be a conventional camera. The recording processor RPR may comprise, for example, an instruction-executing device and a program memory into which a set of instructions has been loaded that define operations of the recording processor RPR, which will be described hereinafter. The storage medium STM may be in the form of, for example, a hard disk, a writable optical disk, or a solid-state memory. The depth scanner DS may comprise, for example, a laser beam that can be steered in various directions, and a sensor that detects reflections of the laser beam. As another example, the depth scanner DS may comprise a radar imaging module. As yet another example, the depth scanner may even be in the form of a human being who creates depth maps off-line.

The 3-D video generation system GSY basically operates as follows. The pair of cameras RCAM, LCAM provides a basic 3-D video of the scene SCN, which is formed by a sequence of picture pairs. A picture pair comprises a right picture and a left picture. The right picture, which is captured by the right camera RCAM, is intended for the right eye of a human observer. The left picture, which is captured by the left camera LCAM, is intended for the left eye of a human observer.

The right camera RCAM and the left camera LCAM have a particular positional relationship with respect to each other. This positional relationship may be defined by a typical rendering context in terms of, for example, screen size and a viewing distance. For example, the basic 3-D video, which comprises a sequence of right pictures and a sequence of left pictures that are interrelated, may be intended for display in a cinema with a typical screen size of 12 meters and a typical viewing distance of 18 meters.

The depth scanner DS carries out a series of depth measurements for a left picture, while the left camera LCAM captures the left picture. A depth measurement provides a depth indication value for a particular portion of the left picture concerned. Such a particular portion may comprise a single pixel or a cluster of pixels, which may constitute a block. For example, the left picture may effectively be divided into various blocks of pixels, whereby the depth scanner DS provides respective depth indication values for respective blocks of pixels. For a block of pixels that partially represents the person in the scene SCN, the depth scanner DS may provide a depth indication value that represents the distance between the person in the scene SCN and virtual observer.

The recording processor RPR may thus generate a depth map for a left picture that comprises the respective depth indication values that the depth scanner DS provides for this left picture. Such a depth map may be regarded as an extension of the left picture, which adds an extra dimension from 2-D to 3-D. In other words, the depth map adds a depth indication value to a pixel of the left picture, which comprises a luminance value, and a pair of chrominance values for the pixel concerned. The depth map is specifically dedicated to the left picture: a depth indication value is associated with at least one pixel in the left picture, whereas it may not be possible to associate the depth indication value with any pixel in the right picture. The depth map may have a lower resolution than the left picture. In that case, neighboring pixels share the same depth indication value, which applies to a cluster of pixels.

It should be noted that depth indication values may be provided in numerous different forms. For example, a depth indication value may be in the form of a parallax value, which is defined with respect to a typical screen width, a typical viewing distance, and a typical eye distance. Such a parallax value can be converted into a distance value.

The recording processor RPR may further generate a background picture for the left picture. The background picture represents objects, or portions thereof, that are occluded in the left picture by other objects, which have a foreground position. That is, the background picture provides information about what is behind an object in the left picture that has a foreground position. This information can be used to advantage in generating a 3-D representation of the left image on the basis of the depth map. Referring to FIG. 1, the house has a background position, whereas the person has a foreground position and may therefore occlude a portion of the house in a left picture. The background picture may thus comprise, at least partially, the portion of the house that is occluded by the person in the left picture. It should be noted that the background picture may further comprise a depth map specifically dedicated thereto. Stated otherwise, the background picture may comprise texture information as well as depth information, which provides a 3-D representation of occluded objects. The recording processor RPR may generate the background picture for the left picture on the basis of, for example, information comprised in the right picture.

The recording processor RPR may further generate an alpha-map, which is specifically dedicated to a left picture. An alpha-map can advantageously be used for providing gradual transitions in a shifted viewpoint picture that is generated from the left picture, the depth map and the background picture. This contributes to perceived image quality. The alpha-map may be regarded as a set of gross weighting coefficients, which may determine a degree of contribution from the left picture and a degree of contribution from the background picture for a particular portion of the shifted viewpoint picture. Such an alpha-map can define different blending parameters for different picture portions, which allows smooth transitions.

The recording processor RPR generates a versatile 3-D video signal VS by adding elements to the basic 3-D video, which the right camera RCAM and the left camera LCAM provide. These elements include depth maps and, optionally, background pictures and alpha-maps, which may be generated as described hereinbefore. The storage medium STM stores the versatile 3-D video signal VS. The versatile 3-D video signal VS may be subject to further processing, which contributes to satisfactory 3-D rendering on a wide variety of displays. This will be described in greater detail hereinafter.

Figure 2:
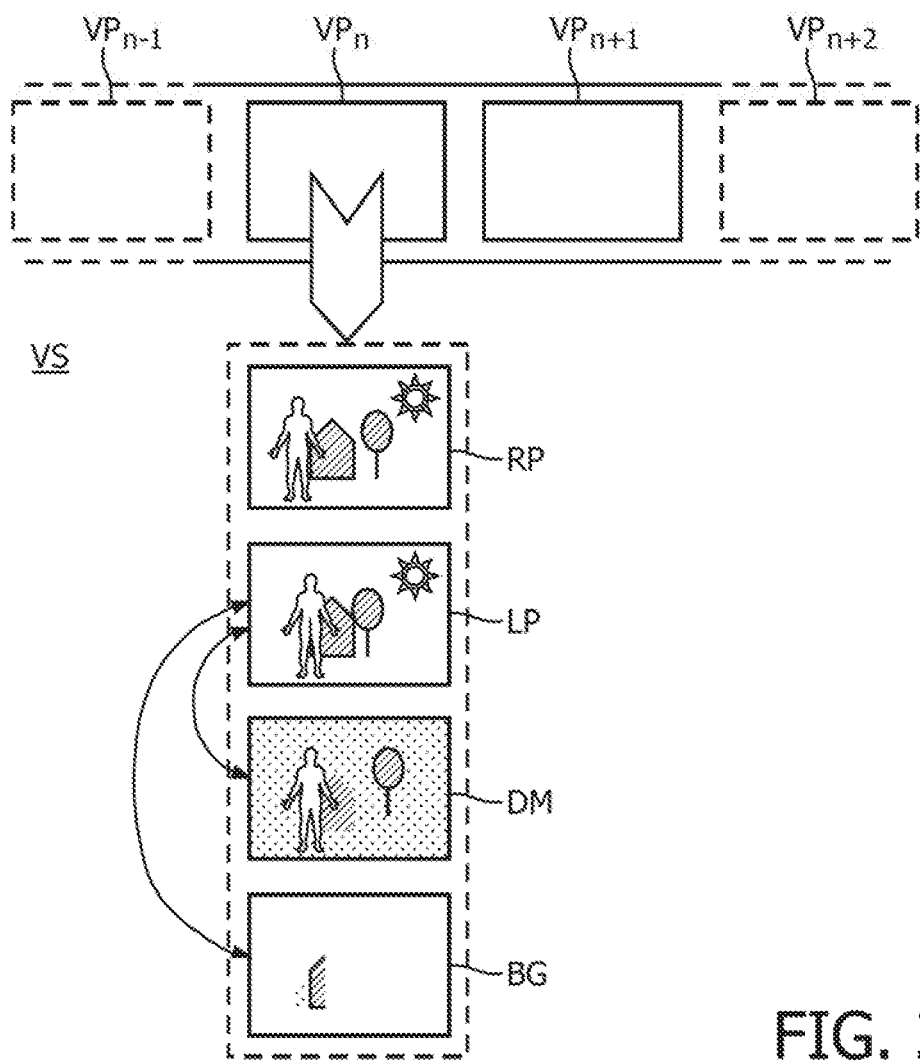
FIG. 2 is a conceptual diagram that illustrates a versatile 3-D video signal, which the 3-D video generation system provides.

FIG. 2 illustrates the versatile 3-D video signal VS. The versatile 3-D video signal VS comprises a sequence of versatile 3-D pictures . . . , $VP_{n-1}$, $VP_n$, $VP_{n1}$, $VP_{n-2}$, . . . . A versatile 3-D picture constitutes a 3-D representation of the scene SCN illustrated in FIG. 1 at a given instant. FIG. 2 illustrates details of an arbitrary versatile 3-D picture $VP_n$. The versatile 3-D picture $VP_n$ comprises a right picture RP and a left picture LP, which jointly constitute a basic 3-D the picture. The right picture RP provides a comprehensive representation of the scene SCN, which is intended for the right eye of a human observer, whereas the left picture LP provides a comprehensive representation of the scene, which is intended for the left eye of the human observer.

The versatile 3-D picture further comprises a depth map DM and, preferably, a background picture BG and an alpha-map, which is not represented in FIG. 2. The depth map DM is specifically dedicated to the left picture LP as explained hereinbefore. The depth map DM may be regarded as a grayscale image wherein a grayscale value corresponds with a depth indication value relating to a particular pixel, or a particular cluster of pixels in the left image. A relatively low depth indication value may correspond with a bright tone indicating a relatively nearby object, whereas a relatively high depth indication value may correspond with a dark tone indicating a relatively distant object or vice versa. The background picture BG is also preferably specifically dedicated to the left picture LP. In effect, the background picture BG constitutes an extension of the left picture LP in the sense that objects, which are partially or entirely occluded, are represented in the background picture BG. The alpha-map, if present, is also specifically dedicated to the left picture LP.

The versatile 3-D video signal VS thus comprises a sequence of basic 3-D pictures, which correspond to the basic 3-D video mentioned hereinbefore. In addition, the versatile 3-D video signal VS comprises an accompanying sequence of depth maps and, preferably, an accompanying sequence of background pictures and an accompanying sequence of alpha-maps. As explained hereinbefore, these additional elements are specifically dedicated to left pictures comprised in the basic 3-D video.

The basic 3-D video, which is comprised in the versatile 3-D video signal VS, may be displayed on a stereoscopic display device, whereby left pictures and right pictures are applied to the left eye and the right eye, respectively, of a viewer. The stereoscopic display has a given screen size and the viewer is at a given distance from the stereoscopic display device. This defines a given rendering context.

An actual rendering context may be similar to the typical rendering context for which the basic 3-D video is intended. In that case, a satisfactory 3-D representation of the scene SCN is obtained. For example, let it be assumed that the basic 3-D video is intended for display in a cinema with a typical screen size of 12 meters and a typical viewing distance of 18 meters, as mentioned hereinbefore. In case the basic 3-D video is rendered in such a cinema, a satisfactory 3-D the representation of the scene is obtained.

However, in case the actual rendering context is different from the typical rendering context for which the basic 3-D video is intended, this may result in a less satisfactory 3-D representation of the scene SCN. This may be the case, for example, if the basic 3-D video is intended for display in a cinema as described hereinbefore, whereas the basic 3-D video is rendered on a home video set with a screen size of 1 meter and a typical viewing distance of 2½ meters. This may result in a reduced depth effect, in the sense that the viewer will experience a lesser degree of depth that in the cinema. Moreover, this may also result in a depth shift towards the viewer, in the sense that an object that appears to be far behind the screen in the cinema, appears to be nearly in front of the screen of the home set. Stated simply, when the 3-D video that is intended for the cinema is watched at home, the 3-D video will look quite different than in the cinema.

It is possible to provide some form of correction in case the rendering context is different from the rendering context. A new picture pair may be generated on basis of a captured picture pair by means of interpolation or extrapolation. However, such a correction is relatively complicated, and therefore expensive, involving complex hardware or software, or both. What is more, such a correction may introduce perceptible artifacts caused by interpolation errors or extrapolation errors, whichever applies.

The versatile 3-D video signal VS, which is illustrated in FIG. 2, allows a satisfactory 3-D representation in a great variety of rendering contexts. In terms of the aforementioned example, the 3-D video that is intended for the cinema may look similar at home. This is achieved thanks to the addition of a depth map DM, which is specifically dedicated to one picture in a captured picture pair, in this case the left picture LP.

The depth map DM allows generating a new picture on the basis of the left picture LP in a relatively simple and precise fashion. This new picture represents the scene SCN from a viewpoint that is slightly different from that of the left picture LP. The viewpoint may be shifted somewhat to the right or somewhat to the left of that of the left picture LP. The new picture will therefore be referred to as shifted viewpoint picture hereinafter. In principle, the shifted viewpoint picture may represent the scene SCN from the same viewpoint as that of the right picture RP. In this particular case, the shifted viewpoint picture should ideally match with the right picture RP.

Figure 3:
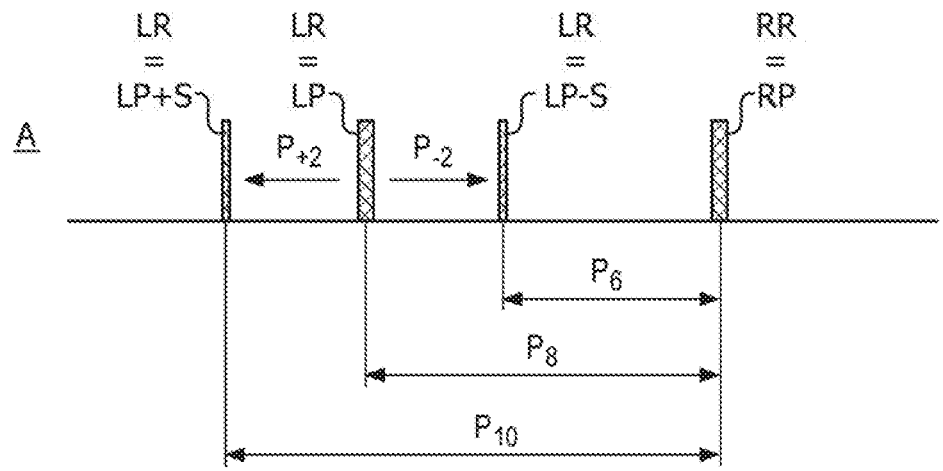
FIG. 3 is a conceptual diagram that illustrates a first stereo mode, which is possible with the versatile 3-D video signal.
Figure 4:
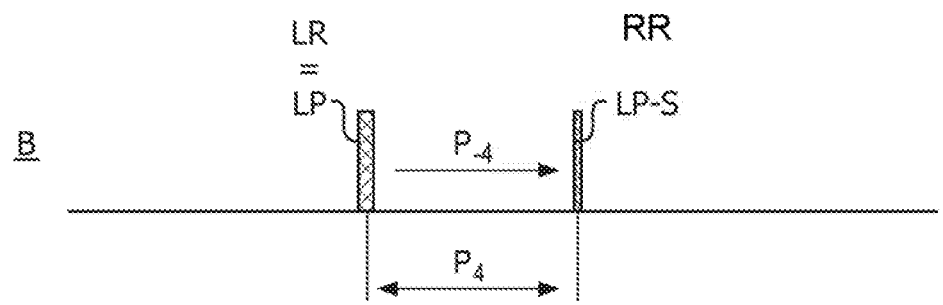
FIG. 4 is a conceptual diagram that illustrates a second stereo mode, which is possible with the versatile 3-D video signal.

FIGS. 3 and 4 illustrate two different stereo modes, which are possible with the versatile 3-D video signal VS illustrated in FIG. 2. These stereo modes will be referred to as stereo mode A and stereo mode B, respectively. In each stereo mode, a pair of rendered pictures is provided for display on a display device on the basis of a versatile 3-D picture. The pair of rendered pictures comprises a rendered left picture LR and a rendered right picture RR, which are applied to the left eye and the right eye, respectively, of a viewer. FIGS. 3 and 4 each comprise a horizontal axis that represents screen parallax. Screen parallax is a position shift on a display that results from a change in viewpoint. Consequently, an object in a shifted viewpoint picture as defined hereinbefore, may be shifted with respect to the same object in the left picture LP.

FIG. 3 illustrates stereo mode A. In this stereo mode, the right picture RP comprised in the versatile 3-D picture constitutes the rendered right picture RR. That is, the rendered right picture RR is a simple copy of the right picture RP. A shifted viewpoint picture, which is generated on the basis of the left picture LP and the depth map DM as mentioned hereinbefore, constitutes the rendered left picture LR.

FIG. 3 illustrates two different shifted viewpoint pictures: a left-shifted viewpoint picture LP+S and a right-shifted viewpoint picture LP−S. The left-shifted viewpoint picture LP+S represents the scene SCN from a viewpoint that is left to that of the left picture LP. This shifted viewpoint picture has a positive parallax shift $P_{+2}$ with respect to the left picture LP. The right-shifted viewpoint picture LP−S represents the scene SCN from a viewpoint that is right to that of the left picture LP. This shifted viewpoint picture has a negative parallax shift $P_{-2}$ with respect to the left picture LP. FIG. 3 also illustrates a particular case, in which the left picture LP constitutes the rendered left picture LR, the latter being a simple copy of the first one.

In case the left-shifted viewpoint picture LP+S constitutes the rendered left picture LR, the viewer experiences a greater depth effect than when the left picture LP constitutes the rendered left picture LR. There is an increase in stereo strength. Conversely, in case the right-shifted viewpoint picture LP−S constitutes the rendered left picture LR, the viewer experiences a smaller depth effect than when the left picture LP constitutes the rendered left picture LR. There is a decrease in stereo strength. Stated boldly, left-shifting increases the stereo strength, whereas right-shifting decreases the stereo strength.

The stereo strength may be evaluated in terms of parallax. For example, a standard stereo strength may correspond with parallax $P_8$ indicated in FIG. 3, which is obtained when the left picture LP constitutes the rendered left picture LR. A maximum stereo strength may correspond with parallax $P_{10}$ indicated in FIG. 3, which is obtained when the left-shifted viewpoint picture LP+S constitutes the rendered left picture LR. Parallax $P_{10}$ corresponds with parallax $P_8$ to which the positive parallax shift $P_{+2}$ is applied. A moderate stereo strength may correspond with parallax $P_6$ indicated in FIG. 3, which obtained when the right-shifted viewpoint picture LP−S constitutes the rendered right picture RR. Parallax $P_6$ corresponds with parallax $P_8$ to which the negative parallax shift $P_{-2}$ is applied.

FIG. 4 illustrates stereo mode B. In this stereo mode, the left picture LP comprised in the versatile 3-D picture constitutes the rendered left picture LR. That is, the rendered left picture LR is a simple copy of the left picture LP. A right-shifted viewpoint picture LP−S, which is generated on the basis of the left picture LP and the depth map DM as mentioned hereinbefore, constitutes the rendered right picture RR. The right-shifted viewpoint picture LP−S has a negative parallax shift $P_{-4}$ with respect to the left picture LP. The stereo strength is entirely determined by this negative parallels shift. The right picture RP need not play any particular role in stereo mode B. That is, the right picture RP may effectively be ignored in stereo mode B.

Stereo mode A is preferably used in a stereo strength range comprised between the maximum stereo strength and a moderate stereo strength. The standard stereo strength is comprised in this range. Stereo mode B is preferably used in a stereo strength range comprised between the moderate stereo strength and the minimum stereo strength. That is, stereo mode B can be used when a relatively small depth effect is desired. The minimum stereo strength may correspond with the absence of any depth effect, that is, a purely two dimensional representation. In this extreme case, the parallax is equal to 0: the rendered left picture LR and the rendered right picture RR are identical.

A desired stereo strength may thus be obtained by generating a shifted viewpoint picture and combining the shifted viewpoint picture with the right picture RP or the left picture LP depending on whether stereo mode A or B, respectively, is applied. The shifted viewpoint picture can be generated on the basis of a left picture LP, and the depth map DM associated therewith, according to a predefined, generic rule. This predefined, generic rule may be based on geometrical relationships and may apply for all different viewpoints. In such an approach, a pixel in the left picture LP is shifted, as it were, by an amount that is exclusively determined by the three factors: the desired stereo strength, the depth indication value, which the depth map DM provides for the pixel as explained hereinbefore, and the predefined, generic formula. The thus shifted pixel constitutes a pixel of the shifted viewpoint picture.

However, more favorable rendering results may be obtained in case the shifted viewpoint picture is generated in a context-dependent fashion, which takes into account one or more rendering parameters, such as, for example, screen size. Moreover, an author, or another person, may wish to define how a given 3-D video should look in a given rendering context. That is, the author may express a preferred 3-D rendering, which need not necessarily correspond with a 3-D rendering based on geometrical relationships between physical objects. 3-D rendering may involve artistic preferences.

Figure 5:
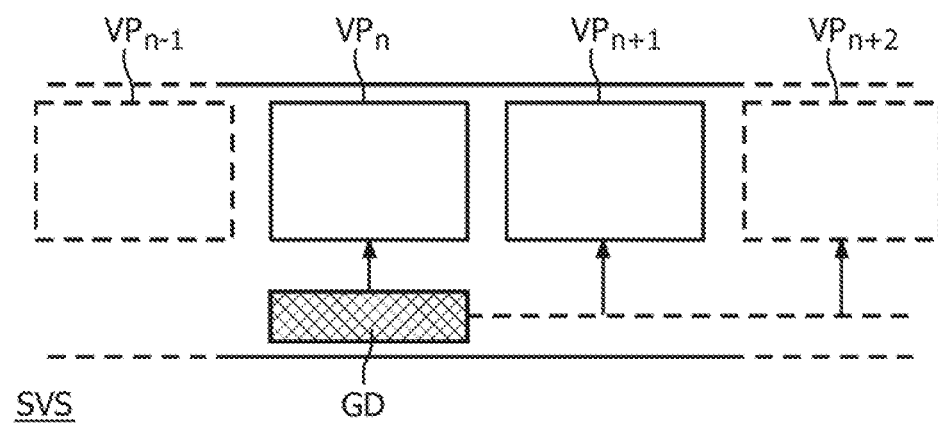
FIG. 5 is a conceptual diagram that illustrates a supplemented versatile 3-D video signal.

FIG. 5 illustrates a supplemented versatile 3-D video signal SVS, which addresses the points mentioned in the preceding paragraph. The supplemented versatile 3-D video signal SVS comprises rendering guidance data GD, which accompanies a sequence of versatile 3-D pictures . . . , $VP_{n-1}$, $VP_n$, $VP_{n1}$, $VP_{n-2}$, . . . . The supplemented versatile 3-D video signal SVS may thus be obtained by adding rendering guidance data GD to the versatile 3-D video signal VS illustrated in FIG. 2.

The rendering guidance data GD comprises parameters that concern the generation of a shifted viewpoint picture on the basis of a left picture and the depth map specifically dedicated to this left picture. The rendering guidance data GD may specify, for example, one or more deviations from a predefined, generic rule, which defines a default method of generating a shifted viewpoint picture. For example, different deviations from a default method may be specified for different stereo strengths. Similarly, different deviations may be specified for different screen sizes. What is more, a deviation need not necessarily apply to the entire 3-D video of interest. Respective deviations may be specified for respective scenes in the 3-D video of interest, or even for respective 3-D pictures. The rendering guidance data GD is therefore preferably organized into various segments, whereby a segment relates to a particular subsequence of 3-D pictures, which may constitute a scene SCN. A segment may also relate to a particular 3-D picture.

FIG. 6 illustrates an example of a parameter set, which may form part of the rendering guidance data GD. The parameter set is represented in the form of a table that comprises three columns, each of which concerns a particular stereo strength expressed as an integer value, namely 10, 6, and 5, whereby 10 represents maximum stereo strength.

Each column has a heading with a shaded filling that indicates the stereo strength and the stereo method to be used for that stereo strength.

The table indicates that stereo mode A illustrated in FIG. 3 should be used for stereo strengths comprised between 10 and 6. The table further indicates that stereo mode B illustrated in FIG. 3 should be used for stereo strengths comprised between 5 and 0. The table further comprises respective lines that represent respective depth indication values. The respective depth indication values are listed in the leftmost column of the table, which has a shaded filling.

The table specifies respective maximum parallax shifts Pmax for respective depth indication values DV, for each of the three aforementioned stereo strengths 10, 6, and 5. The respective maximum parallax shifts Pmax which may be expressed in pixel units, are listed in a white area of the column concerned. A maximum parallax shift defines a maximum displacement between a pixel in a shifted viewpoint picture and the corresponding pixel in the left picture from which the shifted viewpoint picture is generated. The table illustrated in FIG. 6 may thus functionally be regarded as a limiting module in a shifted viewpoint picture generator.

The maximum parallax shifts Pmax specified in the table may prevent effects susceptible to be perceived as unnatural, or effects that may cause eye fatigue, or both. As explained hereinbefore, generating a shifted viewpoint picture involves shifting pixels of the left picture concerned. The amount of shift typically depends on the depth indication value and the stereo strength. A relatively large shift may produce unnatural effects or cause eye fatigue, or other adverse effects. The maximum parallax shifts Pmax specified in the table illustrated in FIG. 6 allows preventing such adverse effects by ensuring that the amount of shift remains within acceptable limits.

Suitable maximum parallax shifts Pmax for stereo strengths between 10 and 6 and between 5 and 0 may be obtained by means of, for example, interpolation. For that purpose, it is sufficient that the table specifies respective maximum parallax shifts Pmax for two different stereo strengths in stereo mode A, such as 10 and 6 in FIG. 6, and for a single stereo strength in stereo mode B, such as 5. There is no need to specify maximum parallax shifts Pmax for two different stereo strengths in stereo mode B because all maximum parallax shifts Pmax for stereo strength 0 may typically be considered as equal to 0. Stereo strength 0 corresponds with mono rendering, that is, a purely two dimensional representation without any depth effects.

FIG. 7 illustrates another example of a parameter set, which may form part of the rendering guidance data GD. The parameter set is represented in the form of a table that comprises several columns, each of which concerns a particular stereo strength STS expressed as an integer value, namely 10, 8, 6, 5, 3, and 1. Each column has a heading with a shaded filling that indicates the stereo strength STS. The table further comprises various lines that represent various different screen sizes SZ, 30, 40, and 50 inch, which are indicated in the leftmost column of the table that has a shaded filling.

The table specifies respective parallax offsets Poff for the various different screen sizes, for each of the three aforementioned stereo strengths 10, 8, 6, 5, 3, and 1. The respective parallax offsets Poff, which may be expressed in pixel units, are listed in a white area of the column concerned. A parallax offset defines an additional displacement for respective pixels in a shifted viewpoint picture with respect to the respective corresponding pixels in the left picture from which the shifted viewpoint picture is generated. That is, the parallax offset defines an overall shift, which is to be added to a specific shift that is obtained for a given pixel by applying a general, predefined rule for generating shifted viewpoint pictures. The table illustrated in FIG. 7 may functionally be regarded as an output offset module in a shifted viewpoint picture generator.

The parallax offset may compensate for a depth shift towards the viewer, which may occur when the 3-D video of interest is rendered on a screen that has a smaller size than that of the screen for which the 3-D video of interest was intended. For example, an object that appears to be far behind a screen in a cinema, may appear to be nearly in front of the screen of a home set, as mentioned hereinbefore. The parallax offsets Poff specified in the table illustrated in FIG. 7 provide an appropriate correction. Suitable parallax offsets for screen sizes and stereo strengths different from those in the table illustrated in FIG. 7 may be obtained by means of, for example, interpolation.

FIG. 8 illustrates yet another example of a parameter set, which may form part of the rendering guidance data GD. The parameter set is represented in the form of a table that comprises three columns, each having a heading with a shaded filling that indicates a column title. The column entitled STS specifies respective stereo strengths. The other column entitled Poff specifying respective parallax offsets Poff. The table further comprises various lines that represent various different screen sizes SZ, 30, 40, and 50 inch, which are indicated in the leftmost column of the table entitled.

The table specifies a preferred combination OPT of stereo strength STS and parallax offset Poff for the various different screen sizes. The stereo strength STS is indicated by means of an integer value, like in the tables illustrated in FIGS. 6 and 7. The parallax offset Poff may be expressed in pixel units, or in other units. Each preferred combination provides a satisfactory rendering for the screen size concerned, which may be different from the typical screen size for which the 3-D video of interest is intended. An author may define the satisfactory rendering. That is, the author can express by means of the table illustrated in FIG. 8, what the 3-D video of interest should look like when rendered on a display with the screen size of interest. Preferred combination for screen sizes different from those in the table illustrated in FIG. 8 may be obtained by means of, for example, interpolation.

The rendering guidance data GD may further comprise an indication of depth map precision and depth map resolution, either explicitly or implicitly. A depth map DM that is relatively imprecise is preferably applied differently than a depth map that is relatively precise when generating a shifted viewpoint picture. For example, there is a relatively great probability that distortions are introduced when a shifted viewpoint picture is generated on the basis of a relatively imprecise depth map. In such a case, pixels should be shifted by a relatively small amount only, so as to ensure that any distortions are relatively weak. Consequently, an indication of depth map precision and depth map resolution can be used to advantage in a 3-D rendering process. Such an indication may also be embedded, as it were, in a table like the table illustrated in FIG. 7, which specifies maximum parallax shifts Pmax.

A depth map may be relatively imprecise in case, for example, depth indication values are estimated solely on the basis of information that is present in a two dimensional picture. A machine or a person, or a combination of both, may generate such an estimated depth map based on, for example, a priori knowledge about objects in the picture concerned, in particular with regard to their respective typical sizes. An object that is typically relatively large in size, but that appears as relatively small in the picture, is probably distant. Adding depth to a picture by means of such estimative techniques may be compared with adding color to a black-and-white picture. A depth indication value may or may not sufficiently approximate the value that would have been obtained, a precise depth map generation technique have been used based on, for example, distance measurements, or analysis of a stereoscopic picture pair.

Figure 9:
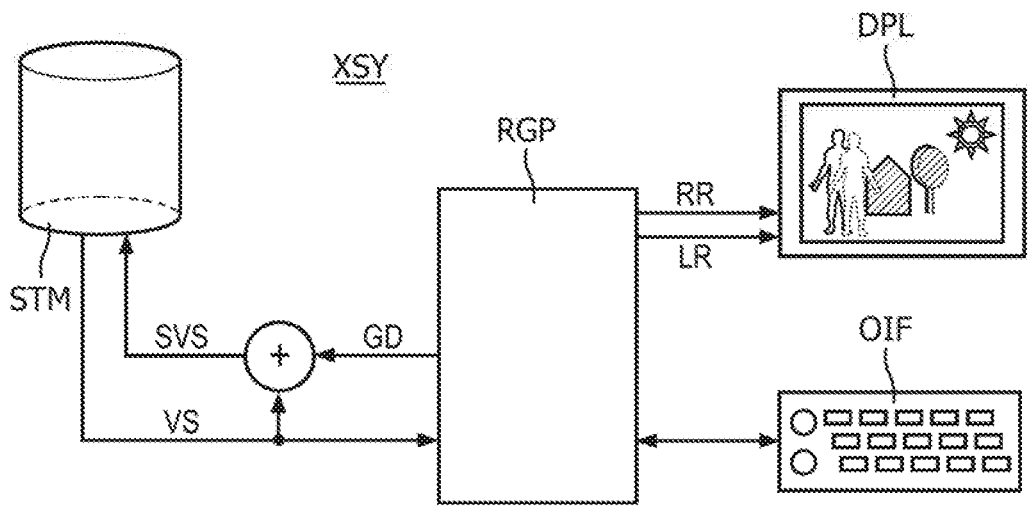
FIG. 9 is a block diagram that illustrates a 3-D video supplementation system, which is capable of providing the supplemented versatile 3-D video signal.

FIG. 9 illustrates a 3-D video supplementation system XSY, which can generate rendering guidance data GD. The 3-D video supplementation system XSY may further add the rendering guidance data GD to the versatile 3-D video signal VS so as to obtain the supplemented versatile 3-D video signal SVS. The 3-D video supplementation system XSY comprises a rendering guidance processor RGP, a display device DPL, and an operator interface OIF. The 3-D video supplementation system XSY further comprises the storage medium STM in which a versatile 3-D video signal VS is stored, as illustrated in FIG. 1.

The rendering guidance processor RGP may comprise, for example, an instruction-executing device and a program memory. The display device DPL is preferably versatile in the sense that the display device DPL may emulate various types of display devices, which may differ in terms of, for example, screen size. Alternatively, various different types of display devices may be used in association with the 3-D video supplementation system XSY illustrated in FIG. 5. The operator interface OIF may comprise, for example, a keyboard, a touch panel, a mouse or a trackball, various knobs, or any combination of those.

Figure 10:
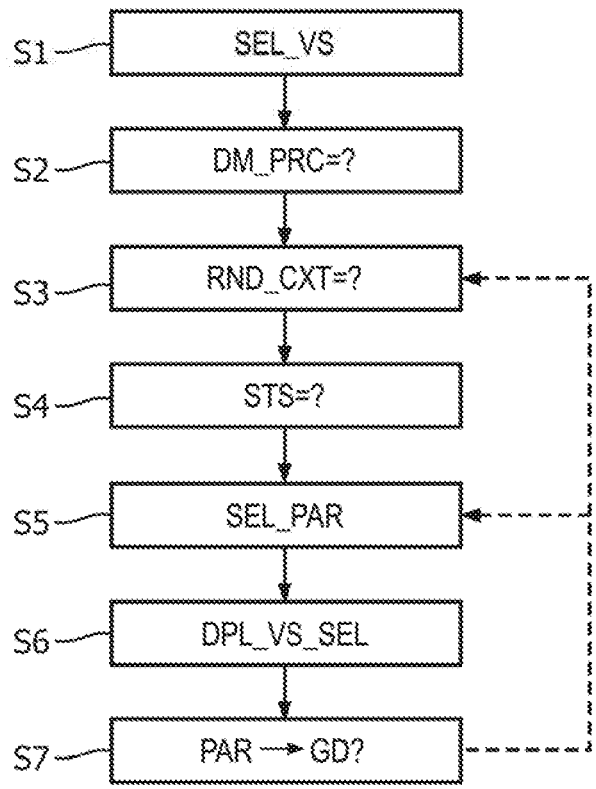
FIG. 10 is a flow chart diagram that illustrates a series of steps that the 3-D video signal supplementation system may carry out.

FIG. 10 illustrates an example of a series of steps S1-S7 that the rendering guidance processor RGP may carry out for the purpose of generating rendering guidance data GD. FIG. 10 may be regarded as a flowchart representation of a set of instructions, which may be loaded into the aforementioned program memory, so as to enable the reference guidance processor to carry out various operations described hereinafter with reference to FIG. 10.

In step S1, the rendering guidance processor RGP prompts a system operator to select a particular portion of the versatile 3-D video signal VS (SEL_VS), if needed, the system operator may select the versatile 3-D video signal VS in its entirety. The particular portion that is selected may correspond with a particular scene, such as the scene SCN illustrated in FIG. 1. As explained hereinbefore, a 3-D rendering that can be considered as optimal for one scene, may not be optimal for another scene. It may therefore be advantageous to evaluate and adjust a 3-D rendering on a scene-per-scene basis.

In step S2, the rendering guidance processor RGP may also prompt the system operator to specify data that indicates depth map precision and depth map resolution (DM_PRC=?). Alternatively, the rendering guidance processor RGP may also comprise a detection module for automatically detecting depth map precision and depth map resolution. As explained hereinbefore, an indication of depth map precision and depth map resolution can be used to advantage in a 3-D rendering process. Such an indication may also be taken into account for generating the rendering guidance data GD. For example, maximum parallax shifts Pmax, which are illustrated in FIG. 6, may be set to lower values in case depth map precision is relatively low, or depth map resolution is relatively low, or both.

In step S3, the rendering guidance processor RGP prompts the system operator to specify a rendering context (RND_CXT=?). The rendering context may be expressed in terms of, for example, a screen size, a typical viewer distance, as well as other rendering-related parameters. The screen size may correspond with that of the display device DPL illustrated in FIG. 10 or may correspond with another screen size, which the display device DPL may emulate as mentioned hereinbefore.

In step S4, the rendering guidance processor RGP prompts the system operator to specify a stereo strength and, optionally, a stereo mode (STS=?). The stereo strength may be in the form of an integer value in a range between 0 and 10. The integer value 0 may correspond with a purely two-dimensional representation, which implies the absence of any depth effects. The integer value 10 may correspond with maximum stereo strength, which provides the highest degree of depth impression. The integer value 8 may correspond with, for example, a standard stereo strength that provides a default degree of depth impression, which is associated with a faithful three-dimensional reproduction of a scene. The system operator may choose between stereo modes A and B, which were described hereinbefore. The stereo mode may be predefined as a function of the stereo strength. In that case, the rendering guidance processor RGP prompts the system operator to specify the stereo strength only.

In step S5, the rendering guidance processor RGP prompts the system operator to specify one or more sets of parameters (SEL_PAR) that potentially may form part of the rendering guidance data GD. A set of parameters may be selected from a menu, or may be specified in a custom fashion. The specified sets of parameters relate to the generation a shifted viewpoint picture on the basis of a left picture and the depth map dedicated to this left picture, which are present in the versatile 3-D video signal VS. The parameters are typically parallax related, as illustrated in FIGS. 6, 7, and 8, and may modify a depth impression. A particular object in the scene concerned may appear closer or further away when the sets of parameters are taking into account in a rendering of the versatile 3-D video signal VS.

In step S6, the rendering guidance processor RGP causes the display device DPL to display the portion of the versatile 3-D video that the system operator has selected in accordance with the rendering context and the stereo strength that the system operator has defined (DPL_VS_SEL). That is, for each versatile 3-D picture in the portion concerned, the rendering guidance processor RGP generates a rendered left picture LR and a rendered right picture RR as illustrated in FIG. 3 or 4, depending on whether the stereo mode is A or B, respectively. In doing so, the rendering processor takes into account the sets of parameters that the system operator has specified. This constitutes a particular rendering of the portion concerned of the versatile 3-D video. The system operator may thus evaluate if this particular rendering is satisfactory or not.

In step S7, the rendering processor determines whether the sets of parameters in accordance with which the rendering has been carried out, should be included in the rendering guidance data GD, or not (PAR→GD?). The rendering guidance processor RGP may do so in numerous different ways. For example, in a basic approach, the rendering guidance processor RGP may prompt the system operator to indicate whether the rendering was satisfactory, or not. In case the system operator indicates that the rendering was satisfactory, the rendering processor may include the sets of parameters concerned in the rendering guidance data GD. In addition, the rendering processor may subsequently carry out step S3 and the steps subsequent thereto, for the purpose of determining appropriate parameter sets for another rendering context.

In a more sophisticated approach, the rendering guidance processor RGP may request the system operator to specify a degree of satisfaction for the particular rendering concerned. The degree of satisfaction may be in the form of a score. In this approach, the rendering guidance processor RGP may carry out steps S5-S7 several times, each time for different sets of parameters. Accordingly, respective scores are obtained for respective different sets of parameters. In case all sets of parameters of interest have been given a score, the rendering guidance processor RGP may select a set of parameters, or the sets of parameters, whichever applies, that have the highest score. These selected set of parameters they can be included in the rendering guidance data GD. The rendering processor may subsequently carry out step S3 and the steps subsequent thereto, for the purpose of determining appropriate parameter sets for another rendering context.

Accordingly, the rendering guidance processor RGP may determine any of the sets of parameters illustrated in FIGS. 6, 7, and 8, or any combination of those, by carrying out the series of steps S1-S7 illustrated in FIG. 10. The rendering guidance processor RGP may take over certain tasks or decisions from the system operator. That is, there may be a higher degree of automation than in the description hereinbefore with reference to FIG. 10, which is merely given by way of example. What is more, one or more decisions that are taken by the system operator may, instead, be taken by a panel representing typical viewers. In such a case, the rendering guidance processor RGP may be provided with, for example, a majority vote module, which determines whether a majority of panel members find the rendering concerned satisfactory, or not, or may be provided with an average score module, which determines an average or given by panel members.

Once the supplemented versatile 3-D video signal SVS illustrated in FIG. 5 has been obtained as described hereinbefore, or otherwise, the supplemented versatile 3-D video signal SVS may be distributed and sold, or licensed, to end users. There are numerous different ways of doing so. For example, the supplemented versatile 3-D video signal SVS may be broadcasted by means of network, which may be wireless or wired, or a combination of those. As another example, the supplemented versatile 3-D video signal SVS may be uploaded into a server from which end users may download the supplemented versatile 3-D video signal SVS. As yet another example, a great number of storage media may be produced on which the supplemented versatile 3-D video signal SVS is recorded. In any of the aforementioned examples, the supplemented versatile 3-D video signal SVS is preferably encoded for the purpose of data compression and error resilience.

Figure 11:
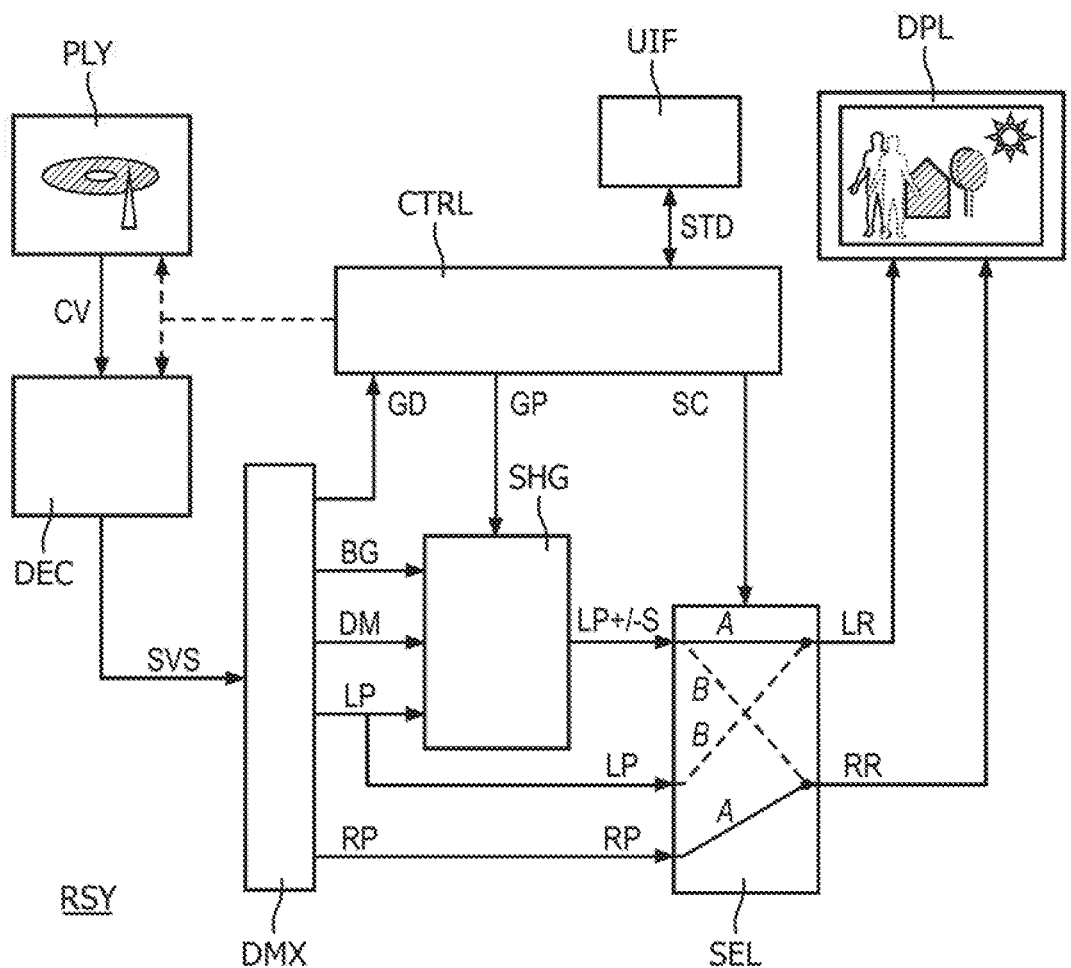
FIG. 11 is a block diagram that illustrates a video rendering system, which allows a stereoscopic rendering based on the versatile 3-D video signal.

FIG. 11 illustrates a video rendering system RSY, which may be installed in an end user's home. The video rendering system RSY comprises a display device DPL of the stereoscopic type, which may require a viewer to wear a pair of glasses. A left-eye glass passes a rendered left picture LR, or rather a sequence thereof, to the left eye. A right-eye glass passes a rendered right picture RR, or rather a sequence thereof, to the right eye. To that end, the display device DPL may alternately display rendered left pictures and rendered right pictures. The left-eye glass is made transparent when a rendered left picture LR is displayed, and is opaque otherwise. Similarly, the right-eye glass is made transparent when a rendered right picture RR is displayed, and is opaque otherwise. As another example, the display device DPL may display the rendered left pictures with a given polarization and the rendered right pictures with an opposite polarization. The left-eye glass and the right-eye glass may then have corresponding opposite polarizations.

The video rendering system RSY further comprises various functional entities: a storage media player PLY, a decoder DEC, a demultiplexer DMX, a shifted viewpoint picture generator SHG, a selector SEL, a controller CTRL and a user interface UIF. All aforementioned functional entities may form part of, for example, a home cinema device. The decoder DEC, the demultiplexer DMX, the shifted viewpoint picture generator SHG, and the selector SEL, may be implemented by means of an instruction-executing device and a program memory. In such an implementation, a set of instructions that is loaded into the program memory may cause the instruction-executing device to carry out operations corresponding to one or more functional entities, which will be described in greater detail hereinafter. The controller CTRL and the user interface UIF may, at least partially, also be implemented in this manner and, moreover, share the same instruction-executing device with the aforementioned functional entities.

The video rendering system RSY basically operates as follows. It is assumed that the storage media player PLY reads a storage medium that comprises a coded version CV of the supplemented versatile 3-D video signal SVS illustrated in FIG. 5. The decoder DEC receives this coded version CV and provides, in response, the supplemented versatile 3-D video signal SVS. The demultiplexer DMX effectively extracts and separates various components comprised in this signal. The rendering guidance data GD is one such component that the controller CTRL receives. The shifted viewpoint picture generator SHG receives various other components comprised in a versatile 3-D picture: a left picture LP, a depth map DM, and a background picture BG. The shifted viewpoint picture generator SHG may further receive an alpha-map, which may be comprised in the versatile 3-D picture. A right picture RP is directly applied to the selector SEL.

The controller CTRL determines a set of shifted viewpoint generation parameters GP and a selector control signal SC on the basis of the rendering guidance data GD and rendering context data, which may be prestored in the video rendering system RSY. The rendering context data defines a rendering context in terms of, for example, the screen size of the display device DPL and the typical viewing distance. The controller CTRL may further take into account a desired stereo strength STD, if any, for the purpose of determining the set of shifted view generation parameters. The viewer may define the desired stereo strength STD by means of the user interface UIF. In case the viewer does not define any desired stereo strength STD, the controller CTRL may operate on the basis of a default stereo strength. The set of shifted viewpoint generation parameters GP may comprise, for example, parameters established on the basis of any of the tables illustrated in FIGS. 6, 7, and 8 taking into account the rendering context, which applies to the video rendering system RSY illustrated in FIG. 10.

The shifted viewpoint picture generator SHG generates a shifted viewpoint picture LP+/−S on the basis of the left picture LP, the depth map DM, and the background picture BG in accordance with the set of shifted viewpoint generation parameters GP. The shifted viewpoint picture generator SHG may advantageously make use of an alpha-map, if such a map dedicated to the left picture LP is available. The shifted viewpoint picture generator SHG either operates in stereo mode A or in stereo mode B, which are illustrated in FIGS. 3 and 4, respectively. The shifted viewpoint generation parameters GP define a degree of shift, which may either be to the right or to the left as illustrated in FIGS. 3 and 4.

The selector control signal SC expresses the stereo mode that applies. In case stereo mode A applies, the selector control signal SC causes selector SEL to select the shifted viewpoint picture LP+/−S to constitute a rendered left picture LR. The selector SEL selects the right picture RP to constitute a rendered right picture RR in that case. Conversely, in case stereo mode B applies, the selector control signal SC causes selector SEL to select the shifted viewpoint picture LP+/−S to constitute the rendered right picture RR. The selector SEL selects the left picture LP to constitute the rendered left picture LR in that case. In either case, the display device DPL provides a 3-D rendering on the basis of the rendered left picture LR and the rendered right picture RR.

Figure 12:
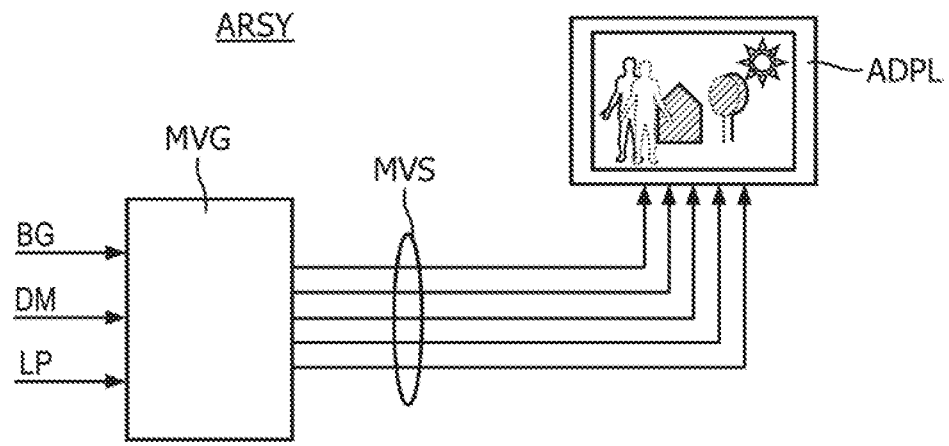
FIG. 12 is a block diagram that illustrates an alternative video rendering system, which comprises an auto-stereoscopic display device.

FIG. 12 illustrates an alternative video rendering system ARSY or rather a portion thereof. The alternative video rendering system ARSY comprises a display device ADPL of the auto-stereoscopic type, which does not require a viewer to wear a pair of glasses. Such a display device typically displays a set of different views MVS, whereby each view is beamed, as it were, in a particular direction. Accordingly, the display device ADPL projects different views to the left eye and the right eye, which causes a viewer to experience a depth effect.

The alternative video rendering system ARSY comprises a multiview generator MVG, which receives the same components as the shifted viewpoint picture generator SHG illustrated in FIG. 11: a left picture LP, a depth map DM, and a background picture BG. These components may be provided by functional entities similar to the storage media player PLY, the decoder DEC, and the demultiplexer DMX, also illustrated in FIG. 11. The multiview generator MVG may further receive an alpha-map that is specifically dedicated to the left picture LP.

The multiview generator MVG generates the set of different views MVS, which are displayed on the display device DPL of the auto-stereoscopic type. In effect, the multiview generator MVG may be regarded as comprising multiple shifted viewpoint picture generators, each of which may be similar to the shifted viewpoint picture generator SHG illustrated in FIG. 11. These respective viewpoint picture generators generate respective shifted viewpoint pictures that represent the scene from respective viewpoints, which are different. That is, in a diagram similar to FIGS. 3 and 4, each respective shifted viewpoint picture has a particular position on the horizontal axis. It should be noted that the multiview generator MVG does not need to make any use of the right picture RP, which associated with the left picture LP. That is, right pictures that are present in the supplemented versatile 3-D video signal SVS need not to be used for the purpose of 3-D rendering.

Hereinabove a 3D format is described which combines the advantages of stereo and so-called image+depth formats. The embodiments below elaborate on how such stereo+ depth formats can be practically implemented for use with both existing and future Blu-ray players. The underlying idea is to use spatial and temporal subsampling of the depth component (and optionally further information such as occlusion data), hereafter also referred to as "D" and formatting it into a three-dimensional video signal comprising both stereo and depth in a 2:2:1 LRD frame rate ratio.

A particular advantageous embodiment of the present invention is aimed at making use of a lower resolution representation of the video signal, in order to generate a stereo plus depth signal that fits within the bandwidth requirements of the original stereo signal. The underlying idea is to make use of a regular 1280*720@60 Hz video stream in order to encode a 1920*1080@24 Hz stereo (LR) plus depth (D) signal.

By moreover making use of 2:1, 2:2:1 interleaving extra frame insertions which can contain various components (such as depth components or transparency components)) of multiple time instances; e.g. $D_{t-1}$ and $D_{t-2}$, may be realized.

The LRD format as proposed earlier, generally requires more (decoding) resources then currently available in Blu-ray players. Also such Blu-ray players lack additional interface ports for stereo signals and depth signals.

It is also noted that the currently used checkerboard stereo pattern has several drawbacks as it does not enable use of typical auto-stereoscopic displays, and the 3D perception is highly screen size dependent.

Also due to the nature of the checkerboard pattern the bit-rate requirements are relatively high (at least twice the required bit-rate as that required for 1080p, 24 Hz, monoscopic video).

It is proposed to overcome both the decoding resource and interface problem by using a 1280*720p time interleaved format with L'R'D' frames wherein:

L'=spatial subsampled left image (1920*1080 ⇒ 1280*720),

R'=spatial subsampled right image (1920*1080 ⇒ 1280*720) and

D'=spatial depth.

Typically, though not mandatory, D' comprises temporal and spatial depth, occlusion texture, occlusion depth and transparency information. D' is temporally subsampled with a factor 2, this means L'+R'+D'=24+24+12 Hz=60 Hz.

Typically a Blu-ray player can decode a video signal such as a 720p image stream encoded using MPEG. Moreover a 720p image signal is a supported video format on known interfaces, like HDMI/CEA. The proposed spatial and temporal sub sampling and interleaving of L, R and D into one 1280*720@60 Hz L'R'D' streams allows an implementation of the present invention on every existing BD player.

Figures 13, 14:
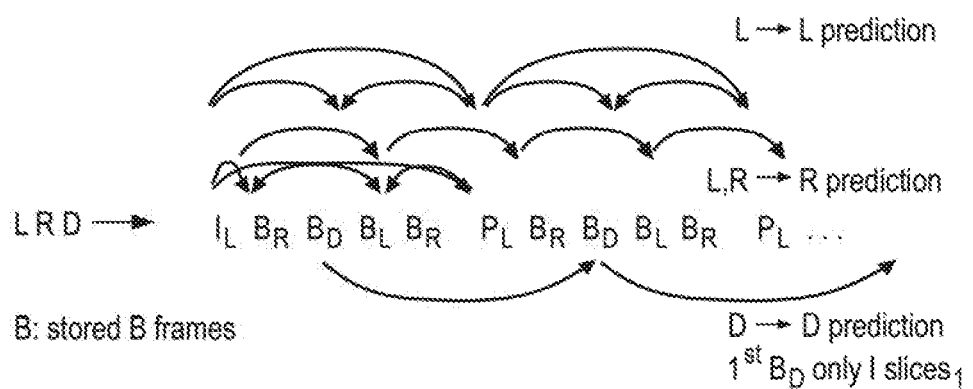
Figure 16:
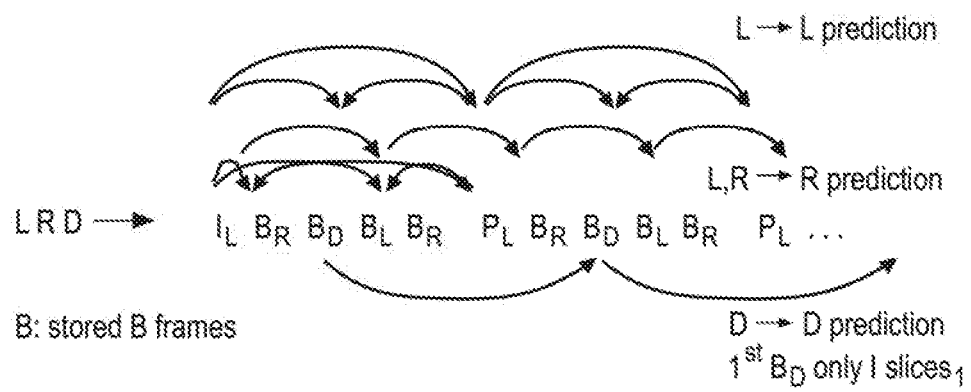
FIG. 16, shows an example of a bit-rate and memory efficient joint coding (with AVC/H264) of L R D (2:2:1 frame rate ratio).

FIG. 13 exemplifies requirements for existing monoscopic BD player decoding as well as the interface (IF) throughput in Mpixels/sec. No special modification needs to be made to existing players in order to support the above L'R'D' encoding. It is noted that in FIG. 13 the D frames comprise depth information (D), transparency information (T), background texture (BG) and background depth (BD). The only issue remaining is resolution of the synchronization problem.

The synchronization problem can be resolved in case the stream is encoded as depicted in FIG. 14. Here it is shown that preferably the L, R and D frames are interleaved so as to for a repeating sequence of L, R, D, L, R frames. Moreover FIG. 14 shows a preferred manner of encoding the images. The HDMI standard has an option to indicate in the so-called Infoframes that the image present on the interface is an original encoded frame, and specifically I, P and B indicators are present. In addition signaling of the L'R'D' encoding to the monitor or display is needed indicating that the signal on the interface is not a regular monoscopic 720p signal, but a 3D-720p signal according to the invention. This may need to be standardized in HDMI/CEA, however as such the interface specification provides ample room to indicate such.

Since the above L'R'D' signal has all the properties of a regular 720p 60 Hz monoscopic signal it can be decoded by Blu-ray players and also can be output to the HDMI output interface thereof.

As indicated above the content of the D' component is typically not limited to depth but may also comprise background texture (BG), transparency (T) and additional metadata information. Metadata can be additional image information to improve the 3D perceived quality, but also content related information (e.g. signaling etc.).

Typical components are D ((foreground) depth), BG (background texture), BD (background depth) and T (transparency map). In principle with the proposed format these components are available at 12 Hz instead of at 24 Hz. They may be temporally upsampled with known or novel upsampling algorithms. However, for some applications upsampling is not required. For instance, when compositing graphics (subtitles, OSD etc.) on top of the video it is useful to have the depth information available such that the graphics can be composited at the correct location, that is at the correct position with respect to depth.

Figure 17:
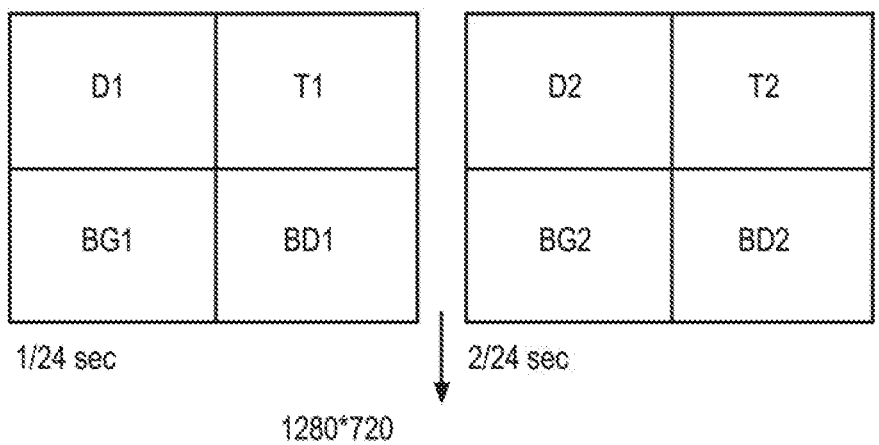
FIG. 17, shows a coding example wherein depth and transparency components are encoded at 12 Hz and wherein depth and transparency relate to different phases.
Figure 17:
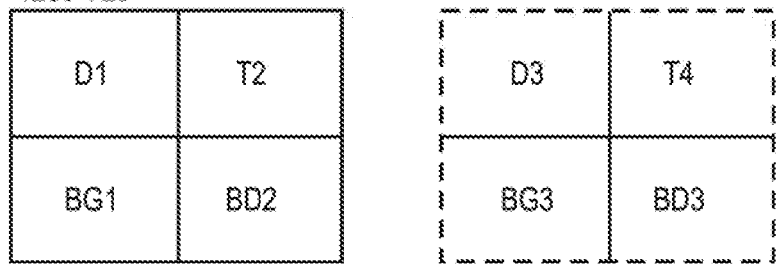

The above can be implemented by having different (i.e. alternating) phases for depth (D) and transparency (T) as seen in FIG. 17. The figure shows a 1280×720 frame comprising depth information D1 and transparency information T2. The component D1 of the 1280×720 frame is based on the D1 component from a 1920×1080 frame at time instance T=$\frac{1}{24}$ sec. The component T2 of the 1280×720 frame is based on the T2 component from a further 1920×1080 frame at time T=$\frac{2}{24}$ sec.

The advantage of having D1 and T2 available from different time-instances is that it allows improved temporal reconstruction of depth by making use of transparency from adjacent time-instances, see FIG. 17.

It is noted that not all components in the D-frame are equally important. This leaves room to skip a component (always or dynamically content dependent and marked with some flags), leaving room for another component to be at the full 24 Hz. This concept is illustrated in FIG. 18, where transparency information from T=$\frac{1}{24}$ and T=$\frac{2}{24}$ are combined within a single 1280×720 frame.

Figure 18:
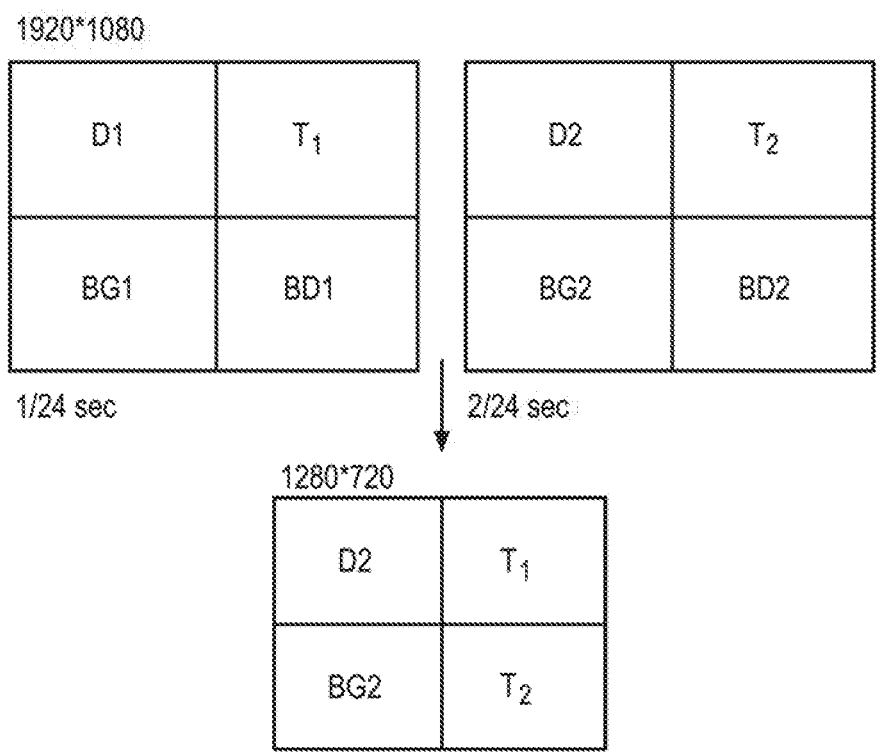
FIG. 18, shows a coding example having mixed 12 and 24 Hz depth components.

Thus FIG. 17 indicates the example where all components are temporally subsampled, and FIG. 18 indicates the solution where the transparency information (T) is only spatially subsampled and not temporally (T1, T2).

New 3D BD

Also for a new to be defined 3D Blu-ray player/specification the LRD type of format according to the present invention could become relevant. It is likely that the throughput of future BD-player systems will for reasons of compatibility and cost will be approximately 2*1080p@30 (or 2*1080i@60 Hz). When the above LRD principle is applied, that is additional information is added, an additional 11% more throughput is required. This is close to 2*1080p@30 Hz. Increasing the maximum throughput with an 11% higher value could be acceptable for future systems, depending on the advantages.

For future 3D Blu-ray players, quality is very important. Experiments have shown that in particular the spatial subsampling; i.e. horizontally and vertically subsampling with a factor of 2:1 of both the depth and transparency components may reduce quality too much (see also FIG. 21). One option to ameliorate this situation is to apply so-called quinqunx subsampling based on diagonal filtering as illustrated in FIG. 21. For example 1920*1080 pixels can first, be vertically subsampled to 1920*540, then diagonal filtered and quinqunx subsampled, after this we end up with 960*540 (quinqunx) samples. However these samples preserve in the horizontal direction the full 1920 resolution.

Figure 19:
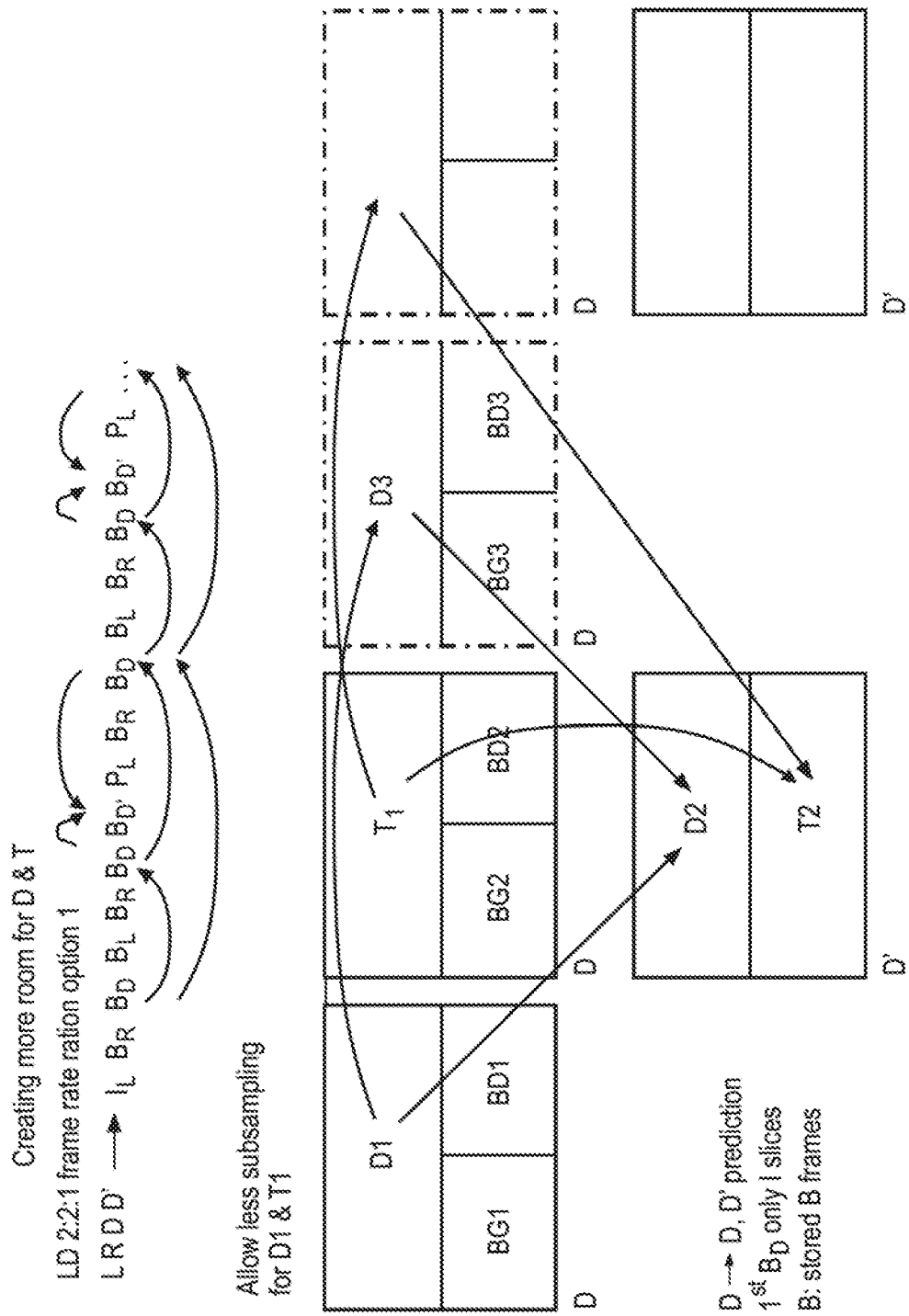
FIG. 19, shows frame interleaving and compression in LRDD' mode, and shows the respective contents of the D and D' frames.

Another approach would be to only subsample in the vertical direction for depth and transparency. FIG. 19 shows how this can be implemented using a repeating sequence of L, R, D, L, R, D, D' frames. At the bottom the content of the D-frames is indicated; i.e. the subsequent D, D and D' frames. The arrows in the figure indicate the direction of prediction used in the encoding of the frames.

Within the D-frames the depth (D1, D2, D3) and transparency (T1, T2) are provided alternating at a resolution of 1920*540 pixels. Meanwhile the background texture (BG) and background depth (BD) are provided at 960*540 pixels.

It is noted that in this particular encoding scheme the D frames and D' frames have different contents and rates. The D' type of frame is provided at half the frame rate of that of L and D. The D' frame can be used to allocate the missing time instances of depth and transparency, here D2 and T2. Please note that (some of) the components can also be quinqunx (see FIG. 21) subsampled.

Subsequently the D' frames are interleaved with the LRD information in the LRD stream as indicated in the GOP (Group of Pictures) coding structure in FIG. 19 by encoding LRD-LRDD'-LRD-LRDD' consecutively.

FIG. 19 also shows how in L R D D' mode the depth information D and the depth information D' can be compressed efficiently by using D1 to predict D3 and by using both D1 and D3 to predict D2.

FIG. 15 shows some of the options for encoding video for use with 3D Blu-ray systems. As we can see from FIG. 15 the present invention enables both the encoding of LRD (stereo+depth) for movies full HD and for sports HD.

Figure 20:
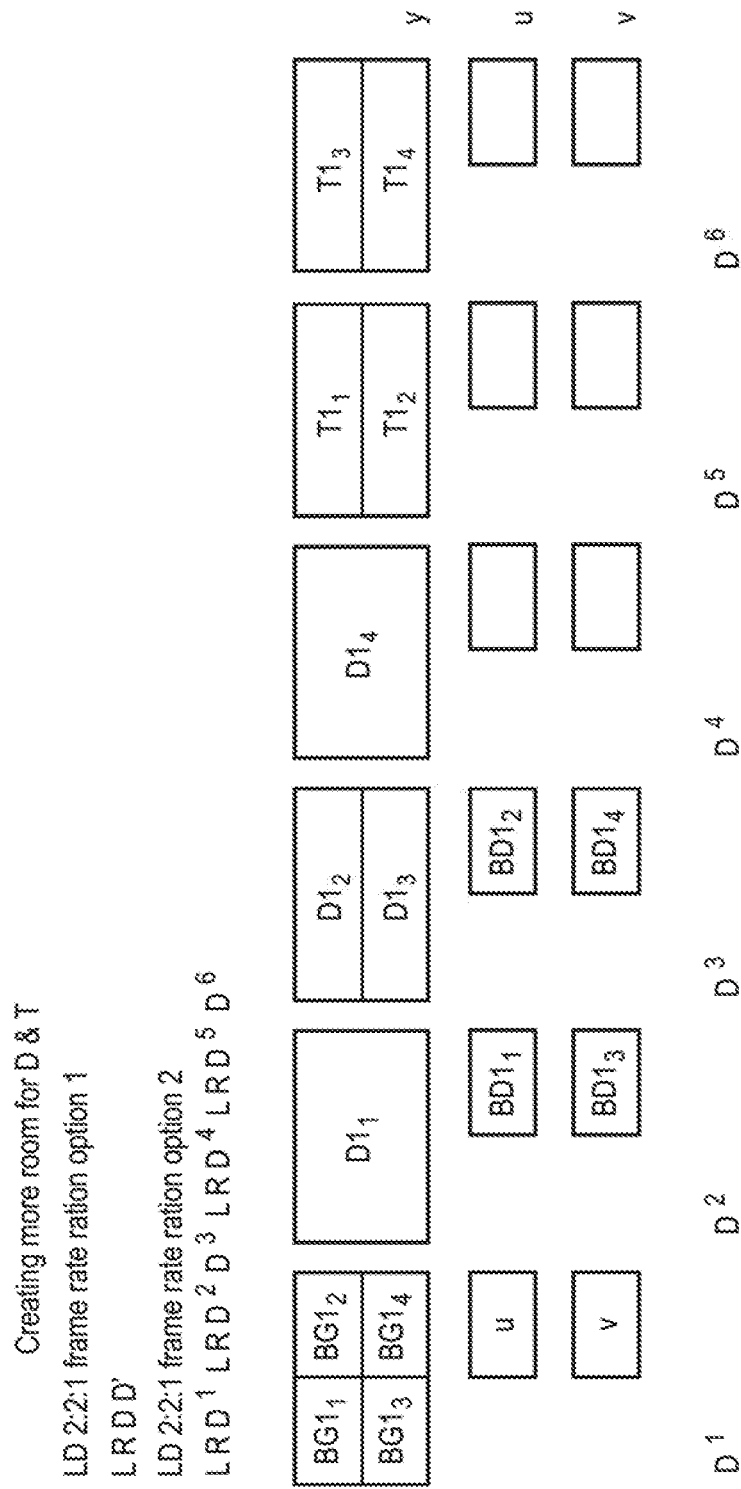
FIG. 20, shows various subsampling methods in order to create room for depth and transparency.

Finally FIG. 20 shows under option 1 an embodiment of the present invention wherein the D-frames for the above-mentioned LRDD' mode are being interleaved. FIG. 20 further shows under option 2 an embodiment of the present invention wherein information from 4 time instances is being combined, whereas the previous option only combined information from 2 time instances. In this latter embodiment Y, U and V components of the video signal are used to carry different information, e.g. within the $D^2$-frame the U-component carried Background Depth for T=1 whereas the V-component carries Background Depth for T=2. The individual components Y, U and V are depicted for respective D-frames.

The contents of the respective D-frames of this second option; $D^1$, $D^2$, $D^3$, $D^4$, $D^5$, $D^6$ are depicted below the interleaving example.

In this embodiment the background texture for four time instances ($BG1_1$, $BG1_2$, $BG1_3$, $BG1_4$) is packed in one frame (for 4 time instances), as a result the D frames can be used more efficiently. This embodiment effectively capitalizes on the fact that a depth component generally is of similar size as that provided by the UV components. This even allows one of the 2 D or T to be at full 1920*1080 res for 12 Hz, where the other time instances are at 1920*540. As can be seen in FIG. 20, there even may be some spare room left.

Concluding Remarks

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of products or methods related to 3-D visual representations. A 3-D video is merely an example. The invention may equally be applied for 3-D still pictures, that is, 3-D photos.

There are numerous ways of providing a 3-D video picture in accordance with the invention. FIG. 1 illustrates an implementation that comprises a pair of cameras RCAM, LCAM. In this example, the pair of cameras captures real pictures. In another implementation, virtual picture pairs may be generated by means of, for example, a suitably programmed processor. A depth map need not necessarily be obtained by means of a depth scanner, or a similar measurement device. A depth map may be established on the basis of estimations, as mentioned hereinbefore in the detailed description. What matters is that the depth map is specifically dedicated to one picture in a pair of pictures that, as such, constitutes a 3-D visual representation.

A depth map may either be specifically dedicated to a left picture, as in the detailed description hereinbefore, or a right picture. That is, in a different version of the versatile 3-D video signal VS illustrated in FIG. 2, the depth map DM may be specifically dedicated to the right picture RP. In such a variant, a shifted viewpoint picture is generated from the right picture RP and the depth map DM specifically dedicated to this picture. The background picture BG will then be also dedicated to the right picture RP. The background picture BG may be omitted for the purpose of, for example, data reduction or bandwidth reduction.

There are numerous different ways of providing rendering guidance data. The detailed description hereinbefore provides an example with reference to FIG. 10. In this example, a series of steps are carried out, some of which involve an interaction with a system operator. One or more of these interactions may effectively be replaced by an automated decision. It is also possible to generate rendering guidance data in a fully automated manner. It should further be noted that the series of steps illustrated in FIG. 10 need not necessarily be carried out in the order in which these are shown. Moreover, various steps may be combined into one step, or a step may be omitted.

The term "picture" should be understood in a broad sense. The term includes any entity that allows visual rendering, such as, for example, image, frame, or field.

In broad terms, there are numerous ways of implementing functional entities by means of hardware or software, or a combination of both. In this respect, the drawings are very diagrammatic. Although a drawing shows different functional entities as different blocks, this by no means excludes implementations in which a single entity carries out several functions, or in which several entities carry out a single function. For example, referring to FIG. 11, the decoder DEC, the demultiplexer DMX, the shifted viewpoint picture generator SHG, the selector SEL, and the controller CTRL may be implemented by means of a suitably programmed processor or a dedicated processor in the form of an integrated circuit that comprises all these functional entities.

There are numerous ways of storing and distributing a set of instructions, that is, software, which allows a programmable circuit to operate in accordance with the invention. For example, software may be stored in a suitable medium, such as an optical disk or a memory circuit. A medium in which software stored may be supplied as an individual product or together with another product, which may execute software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made herein before demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude a combination of additional features, which corresponds to a combination of dependent claims.

The invention claimed is:

1. A method of providing a 3-D picture signal that conveys a 3-D picture, the method comprising acts of:
   providing an image;
   providing depth components and predicted depth components comprising a depth map for the image, the depth map comprising depth indication values, a depth indication value relating to a particular portion of the image and indicating a distance between an object at least partially represented by the particular portion of the image and a viewer;
   providing the 3-D picture signal that conveys the 3-D picture according to a 3-D format having image frames encoding the image;
   encoding extra frames that include the depth components and the predicted depth components of the depth map, and further data for use in rendering based on the image and the depth components, the extra frames being encoded using at least one of spatial and temporal subsampling of the depth components and the further data;
   interleaving the extra frames including the depth components and the predicted depth components of the depth map with the image frames to form output frames having a sequence including the image frames and the extra frames including a first extra frame including a first depth map component of the depth map components and second and third extra frames including a second depth map component and a predicted depth component of the predicted depth components of the depth map, wherein the first extra frame is separated from the second and third extra frames by the image frames; and
   outputting the 3-D picture signal including the output frames.

2. The method according to claim 1, wherein the image frames and the extra frames are encoded using the at least one of spatial and temporal subsampling of the depth components and the further data at a resolution tuned to a predetermined bandwidth for transfer of the 3-D picture signal.

3. The method according to claim 1, further comprising an act of combining, in an extra frame, information of multiple time instances so that the extra frames comprise components of multiple time instances.

4. The method according to claim 1, wherein the extra frames comprise at least one of temporal and spatial depth, occlusion texture, occlusion depth and transparency information, or at least one of depth information, transparency information, background texture and background depth, and metadata being additional image information to improve 3D perceived quality or content related information.

5. The method according to claim 1, wherein the extra frames are temporally subsampled by at least one of:
skipping a temporally subsampled component while not temporally subsampling another component;
having different phases for depth and transparency; and
a factor 2.

6. The method according to claim 1, wherein the depth components and the further data of the extra frames are spatially subsampled by at least one of:
horizontally and vertically subsampling with a factor of 2:1 of both the depth and transparency components;
quinqunx subsampling based on diagonal filtering; and
only subsampling in the vertical direction.

7. The method according to claim 1, wherein the extra frames regarding first, second and third sequential time instances are encoded based on predicting depth components at the third time instance based on depth components at the first time instance, and predicting depth components at the second time instance based on depth components at the first time instance and at the third time instance.

8. The method according to claim 1, wherein the extra frames are encoded as stored bidirectional extra frames, a stored bidirectional extra frame being encoded based on bidirectional predicting using a subsequent stored bidirectional extra frame and a preceding stored bidirectional extra frame.

9. The method according to claim 1, wherein the image frames in the 3D format have different image subframes comprising intensity or color components and different depth components and further data in the extra frames are accommodated in the different image subframes.

10. The method according to claim 1, wherein the image frames include left image frames having a picture intended for a left eye of the viewer and right image frames having a picture intended for a right eye of the viewer.

11. The method of claim 1, wherein the sequence of the output frames includes a depth map frame adjacent to a predicted depth map frame.

12. The method of claim 1, wherein the output frames are included in a Group of Pictures coding structure.

13. The method of claim 1, wherein the act of providing depth components and predicted depth components comprises providing the depth components at a rate different from a rate of the predicted depth components.

14. The method of claim 1, wherein the depth components and the predicted depth components have different contents and rates.

15. The method of claim 1, wherein the depth map has a lower resolution than a resolution of the image.

16. The method of claim 1, wherein the second depth map component is adjacent to the predicted depth component.

17. A 3-D picture signal provision system for providing a 3-D picture signal that conveys a 3-D picture, the system comprising:
a picture-providing arrangement for providing an image;
a depth map provider for providing depth components and predicted depth components comprising a depth map for the image, the depth map comprising depth indication values, a depth indication value relating to a particular portion of the image and indicating a distance between an object at least partially represented by that portion of the image and a viewer; and
a signal provider for
providing the 3-D picture signal that conveys the 3-D picture according to a 3D format having image frames encoding the image,
encoding extra frames that include the depth components and the predicted depth components of the depth map, and further data for use in rendering based on the image and the depth components; the extra frames being encoded using at least one of spatial and temporal subsampling of the depth components and the further data, and
interleaving the extra frames including the depth components and the predicted depth components of the depth map with the image frames to form output frames having a sequence including the image frames and the extra frames including a first extra frame including a first depth map component of the depth map components and second and third extra frames including a second depth map component and a predicted depth component of the predicted depth components of the depth map,
wherein the first extra frame is separated from the second and third extra frames by the image frames.

18. A non-transitory computer readable medium comprising computer instructions which, when executed by a processor, configure the processor to perform a method of providing a 3-D picture signal that conveys a 3-D picture, the method comprising acts of:
providing an image;
providing depth components and predicted depth components comprising a depth map for the image, the depth map comprising depth indication values, a depth indication value relating to a particular portion of the image and indicating a distance between an object at least partially represented by that portion of the image and a viewer;
providing the 3-D picture signal that conveys the 3-D picture according to a 3D format having image frames encoding the image;
encoding extra frames that include the depth components and the predicted depth components of the depth map, and further data for use in rendering based on the image and the depth components, the extra frames being encoded using at least one of spatial and temporal subsampling of the depth components and the further data;
interleaving the extra frames including the depth components and the predicted depth components of the depth map with the image frames to form output frames having a sequence including the image frames and the extra frames including a first extra frame including a first depth map component of the depth map components and second and third extra frames including a second depth map component and a predicted depth component of the predicted depth components of the depth map, wherein the first extra frame is separated from the second and third extra frames by the image frames; and
outputting the 3-D picture signal including the output frames.

19. A method of rendering a 3-D picture based on a 3-D picture signal that conveys a 3-D picture and includes an image, encoded extra frames that include depth components and predicted depth components comprising a depth map for the image, the depth map comprising depth indication values, a depth indication value relating to a particular portion of the image and indicating a distance between an object at least partially represented by the particular portion of the image and a viewer, and the encoded extra frames including the depth components and the predicted depth components of the depth map being interleaved with image frames to form output frames having a sequence including the image frames and the encoded extra frames including the depth map components and the predicted depth components of the depth map, the method comprising acts of:

receiving the output frames having the sequence including the image frames and the encoded extra frames including the depth map components and the predicted depth components of the depth map, extracting and separating the encoded extra frames including the depth components and the predicted depth components of the depth map from the output frames having the encoded extra frames interleaved with the image frames forming a sequence including the image frames and the encoded extra frames including a first extra frame including a first depth map component of the depth map components and second and third extra frames including a second depth map component and a predicted depth component of the predicted depth components of the depth map, wherein the first extra frame is separated from the second and third extra frames by the image frames; and generating a shifted viewpoint picture from the image, the depth components and the predicted depth components based on the encoded extra frames that provide the depth components, the predicted depth components and further data, the encoded extra frames being encoded using at least one of spatial and temporal subsampling of the depth components, the predicted depth components and the further data.

20. A 3-D picture rendering system for rendering a 3-D picture based on a 3-D picture signal that conveys a 3-D picture and includes an image, encoded extra frames that include depth components and predicted depth components comprising a depth map for the image, the depth map comprising depth indication values, a depth indication value relating to a particular portion of the image and indicating a distance between an object at least partially represented by the particular portion of the image and a viewer, and the encoded extra frames including the depth components and the predicted depth components of the depth map interleaved with image frames to form output frames having a sequence including the image frames and the encoded extra frames including the depth map components and the predicted depth components of the depth map, the system comprising:

a demultiplexer configured to receive the output frames and extract and separate the encoded extra frames including the depth components and the predicted depth components of the depth map from the output frames having the encoded extra frames interleaved with the image frames forming a sequence including the image frames and the encoded extra frames including a first extra frame including a first depth map component of the depth map components and second and third extra frames including a second depth map component and a predicted depth component of the predicted depth components of the depth map, wherein the first extra frame is separated from the second and third extra frames by the image frames; and a generator configured to generate a shifted viewpoint picture from the image, the depth components and the predicted depth components based on the encoded extra frames that provide the depth components, the predicted depth components and further data, the encoded extra frames being encoded using at least one of spatial and temporal subsampling of the depth components, the predicted depth components and the further data.

21. A method of providing a 3-D picture signal that conveys a 3-D picture, the method comprising acts of:

providing an image;

providing depth components and predicted depth components comprising a depth map for the image, the depth map comprising depth indication values, a depth indication value relating to a particular portion of the image and indicating a distance between an object at least partially represented by the particular portion of the image and a viewer;

providing the 3-D picture signal that conveys the 3-D picture according to a 3D format having image frames encoding the image;

encoding extra frames that include the depth components and the predicted depth components of the depth map, and further data for use in rendering based on the image and the depth components, the extra frames being encoded using at least one of spatial and temporal subsampling of the depth components and the further data;

interleaving the extra frames including the depth components and the predicted depth components of the depth map with the image frames to form output frames having a sequence including the image frames and the extra frames including the depth map components and the predicted depth components of the depth map; and outputting the 3-D picture signal including the output frames, wherein the sequence of the output frames includes a repeating sequence of LRDLRDD', where L is a left image frame of the image frames, R is a right image frame of the image frames, D is a depth component of the depth map of the extra frames, and D' is a predicted depth component of the depth map of the extra frames.

22. A method of providing a 3-D picture signal that conveys a 3-D picture, the method comprising acts of:

providing an image;

providing depth components and predicted depth components comprising a depth map for the image, the depth map comprising depth indication values, a depth indication value relating to a particular portion of the image and indicating a distance between an object at least partially represented by the particular portion of the image and a viewer;

providing the 3-D picture signal that conveys the 3-D picture according to a 3D format having image frames encoding the image;

encoding extra frames that include the depth components and the predicted depth components of the depth map, and further data for use in rendering based on the image and the depth components, the extra frames being encoded using at least one of spatial and temporal subsampling of the depth components and the further data;

interleaving the extra frames including the depth components and the predicted depth components of the depth map with the image frames to form output frames having a sequence including the image frames and the extra frames including the depth map components and the predicted depth components of the depth map; and outputting the 3-D picture signal including the output frames, wherein the image includes first and second images intended for a left and right eye of the viewer, and wherein the method further comprises an act of providing an alpha-map dedicated to the first image and defines gradual transitions in a shifted viewpoint picture generated from the first image, the depth map and a background picture.

\* \* \* \* \*